June 21, 1966 C. D. WILLIAMSON 3,257,663
CUFF MAKING MACHINE
Filed Dec. 20, 1961 17 Sheets-Sheet 1

INVENTOR
C. DICKIE WILLIAMSON

BY Mead, Browne, Schuyler & Beveridge
ATTORNEYS

June 21, 1966  C. D. WILLIAMSON  3,257,663
CUFF MAKING MACHINE
Filed Dec. 20, 1961  17 Sheets-Sheet 2
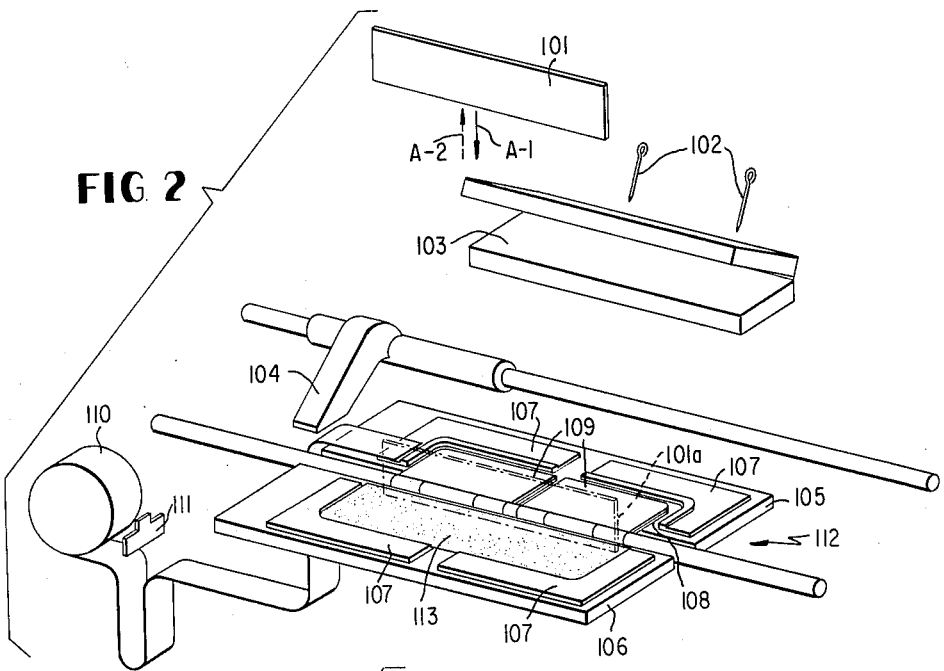
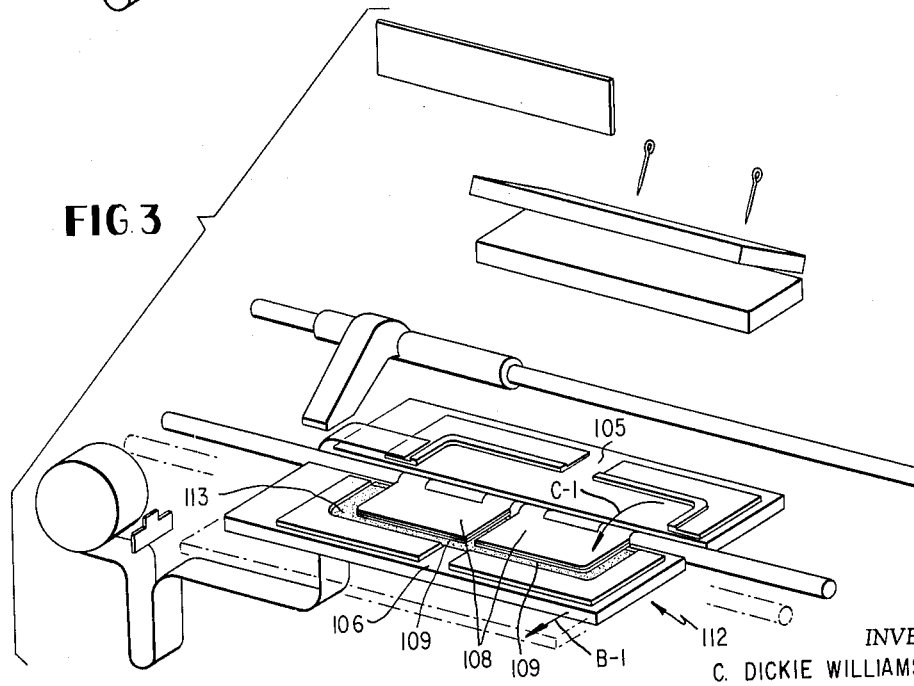
INVENTOR
C. DICKIE WILLIAMSON
BY Mead, Browne, Schuyler & Beveridge
ATTORNEYS

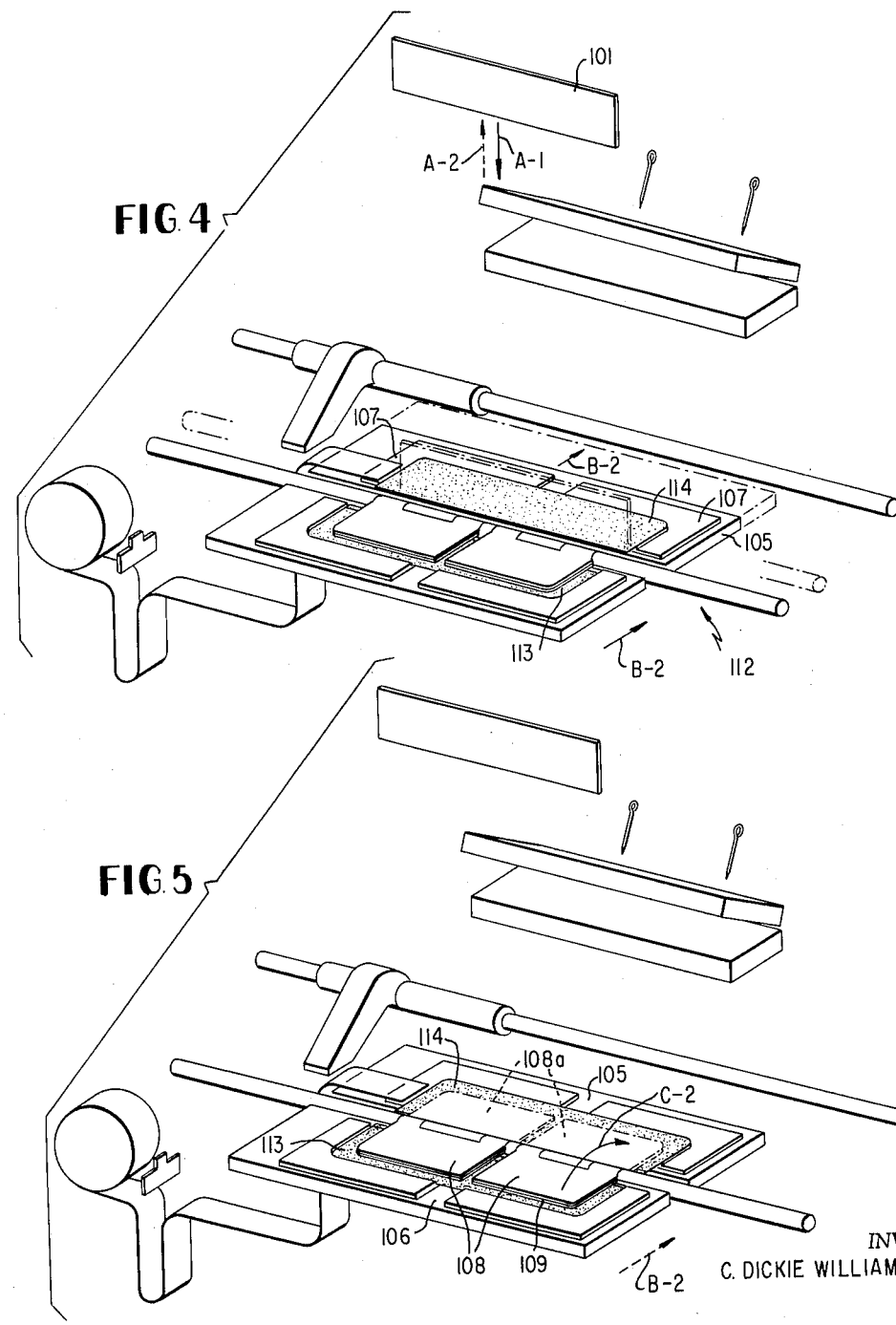

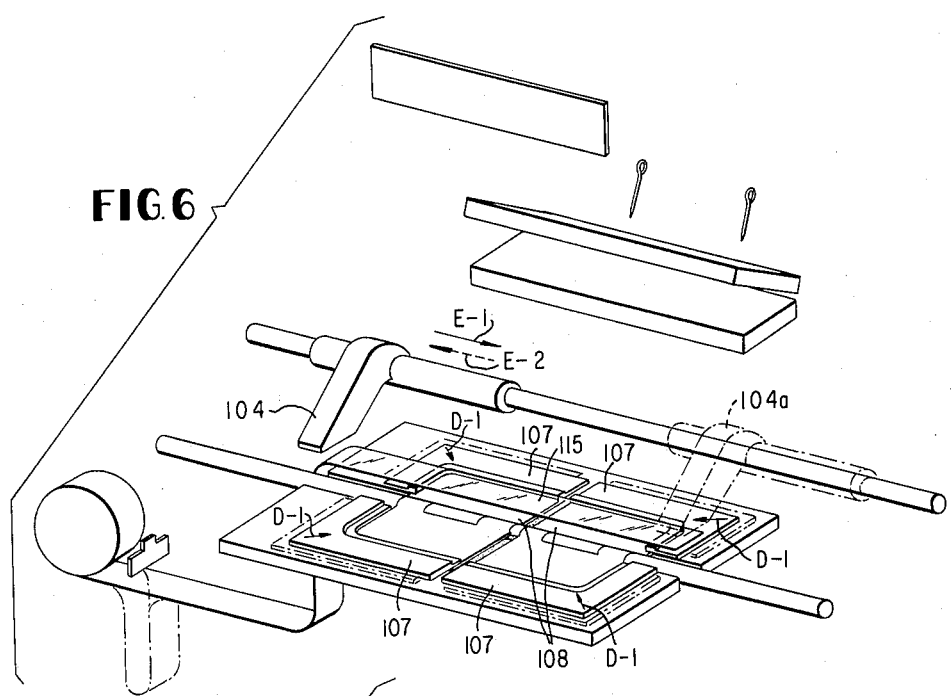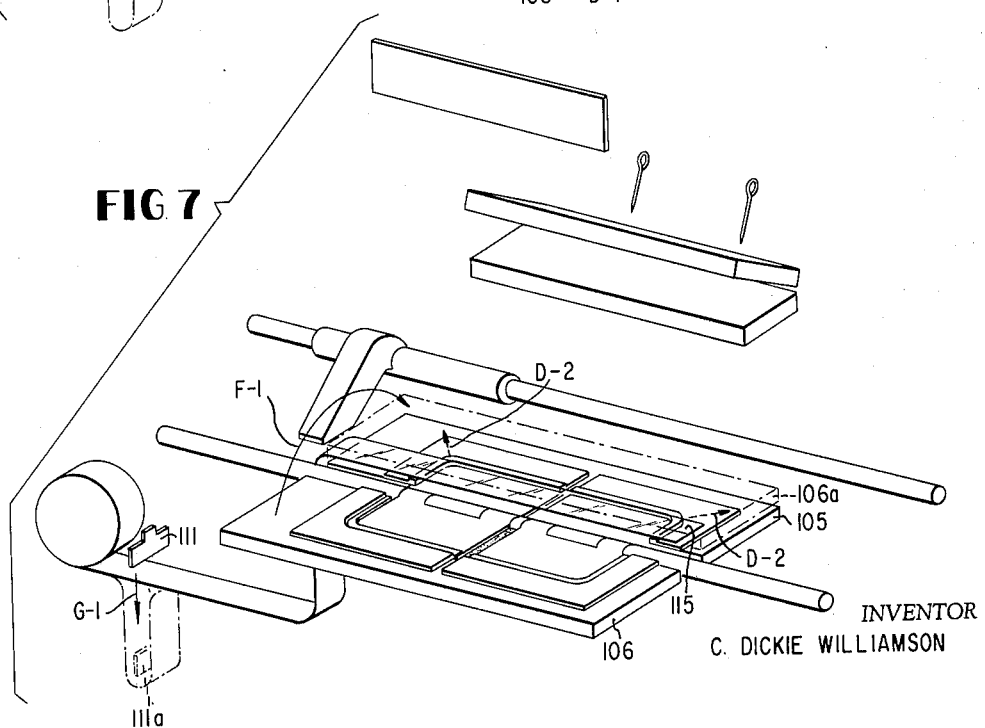

June 21, 1966     C. D. WILLIAMSON     3,257,663
CUFF MAKING MACHINE
Filed Dec. 20, 1961     17 Sheets-Sheet 5
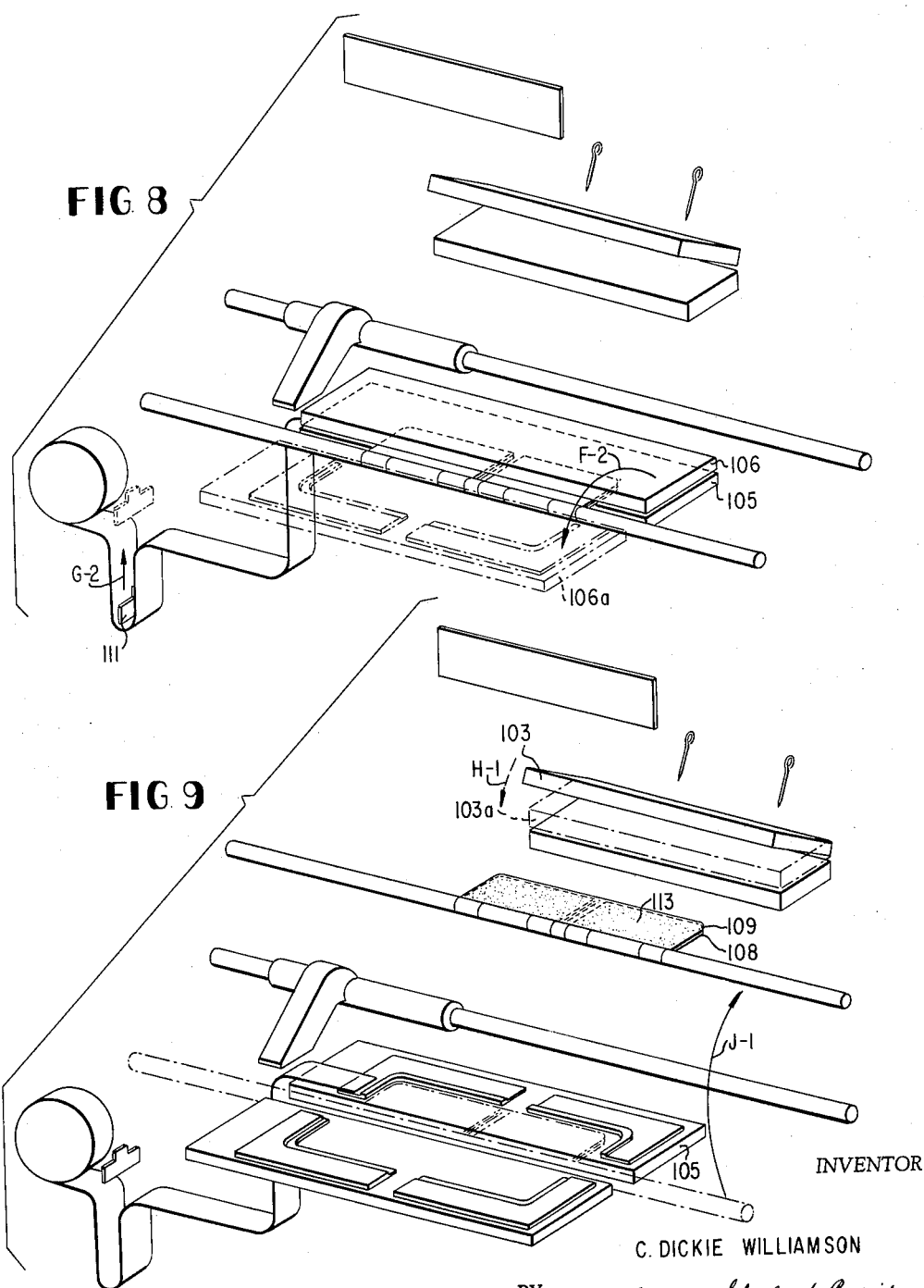
INVENTOR
C. DICKIE WILLIAMSON
BY *Mead, Browne, Schuyler & Beveridge*
ATTORNEYS

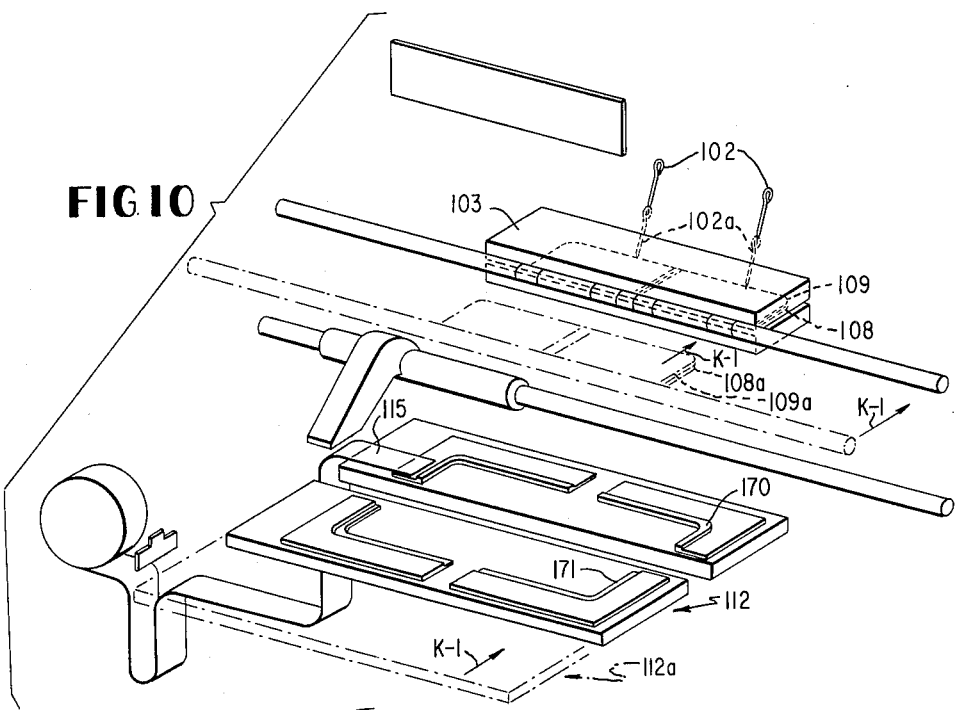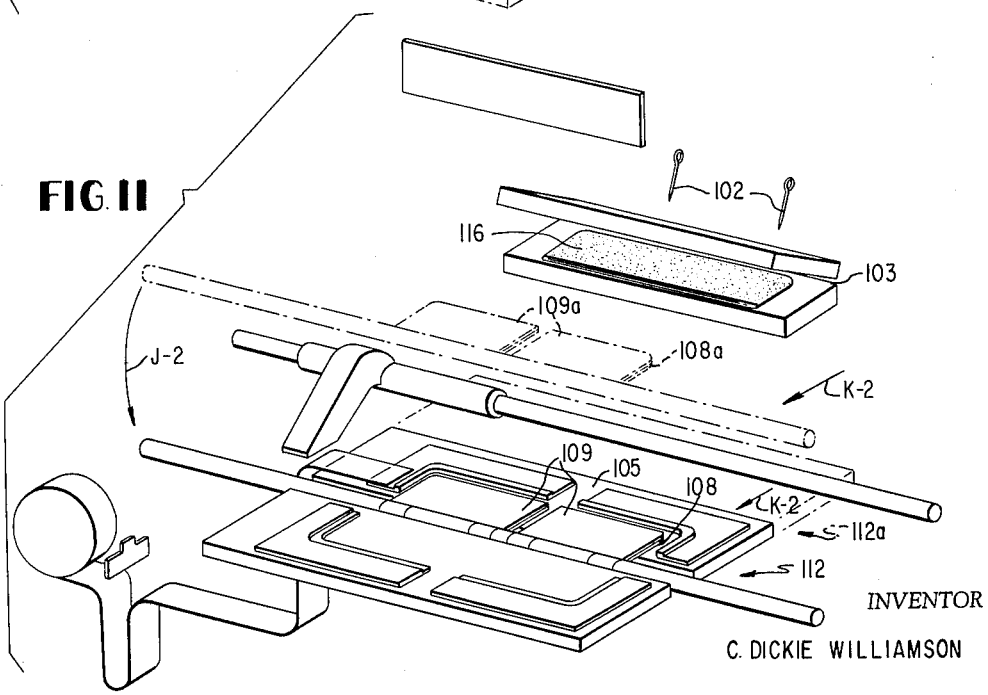

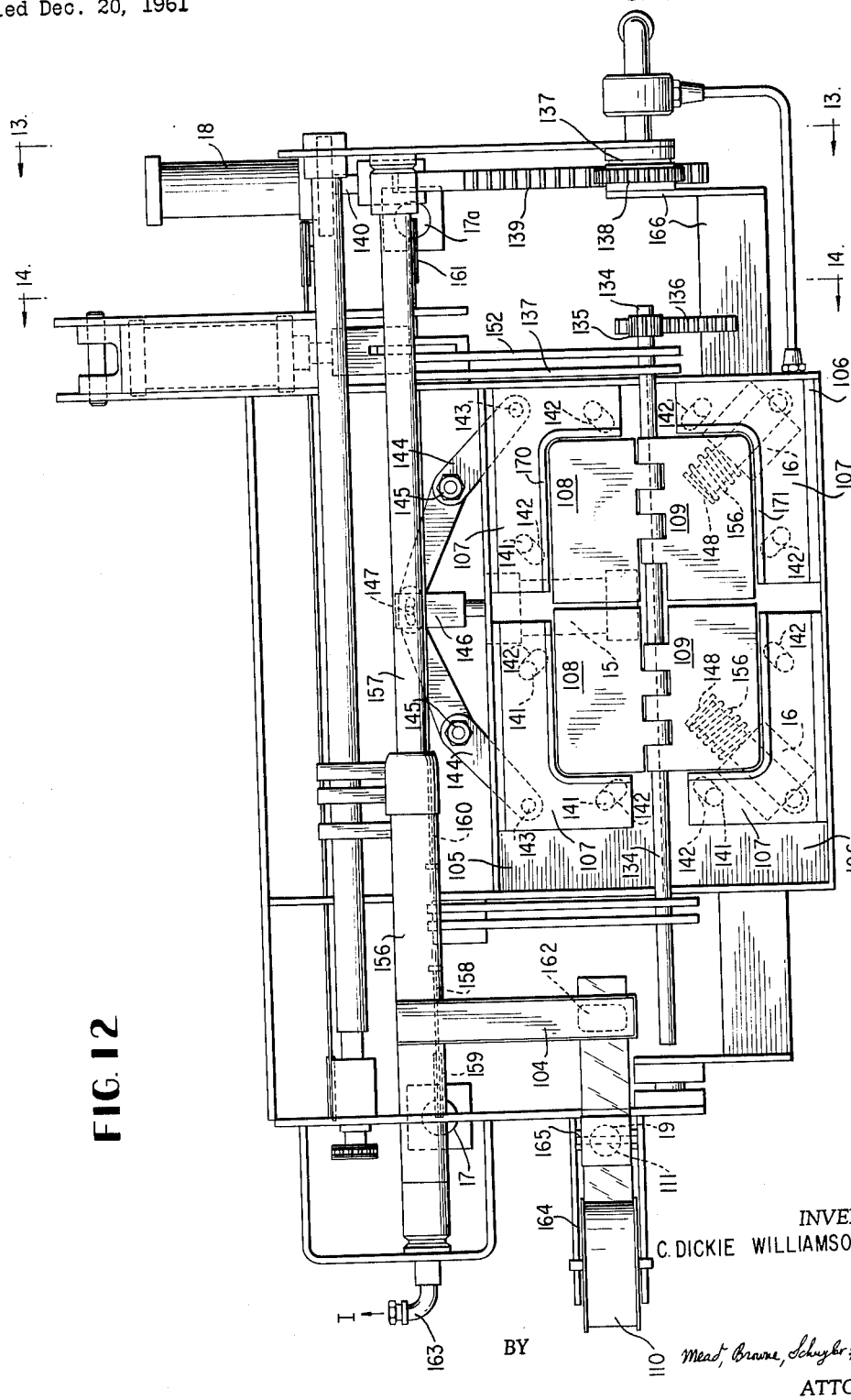

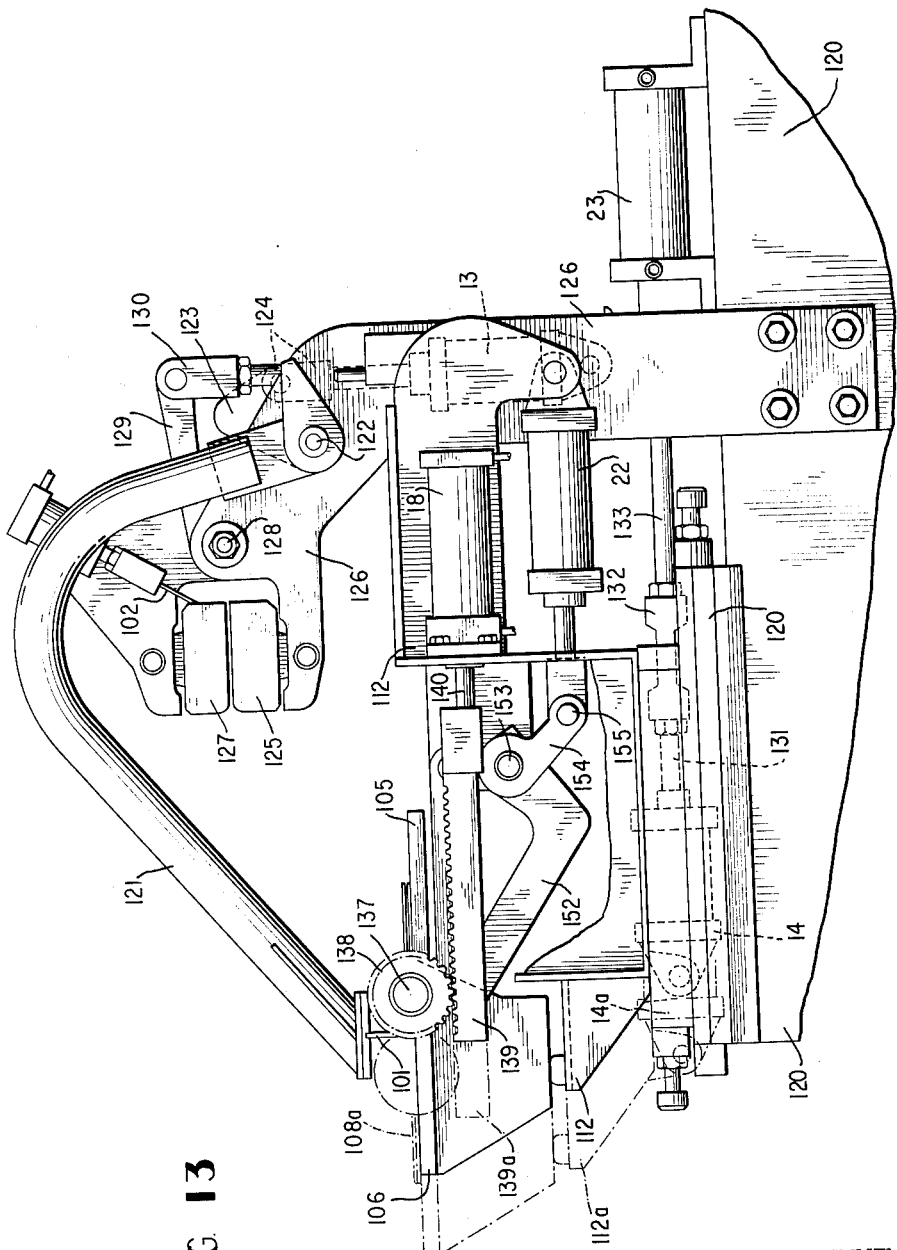

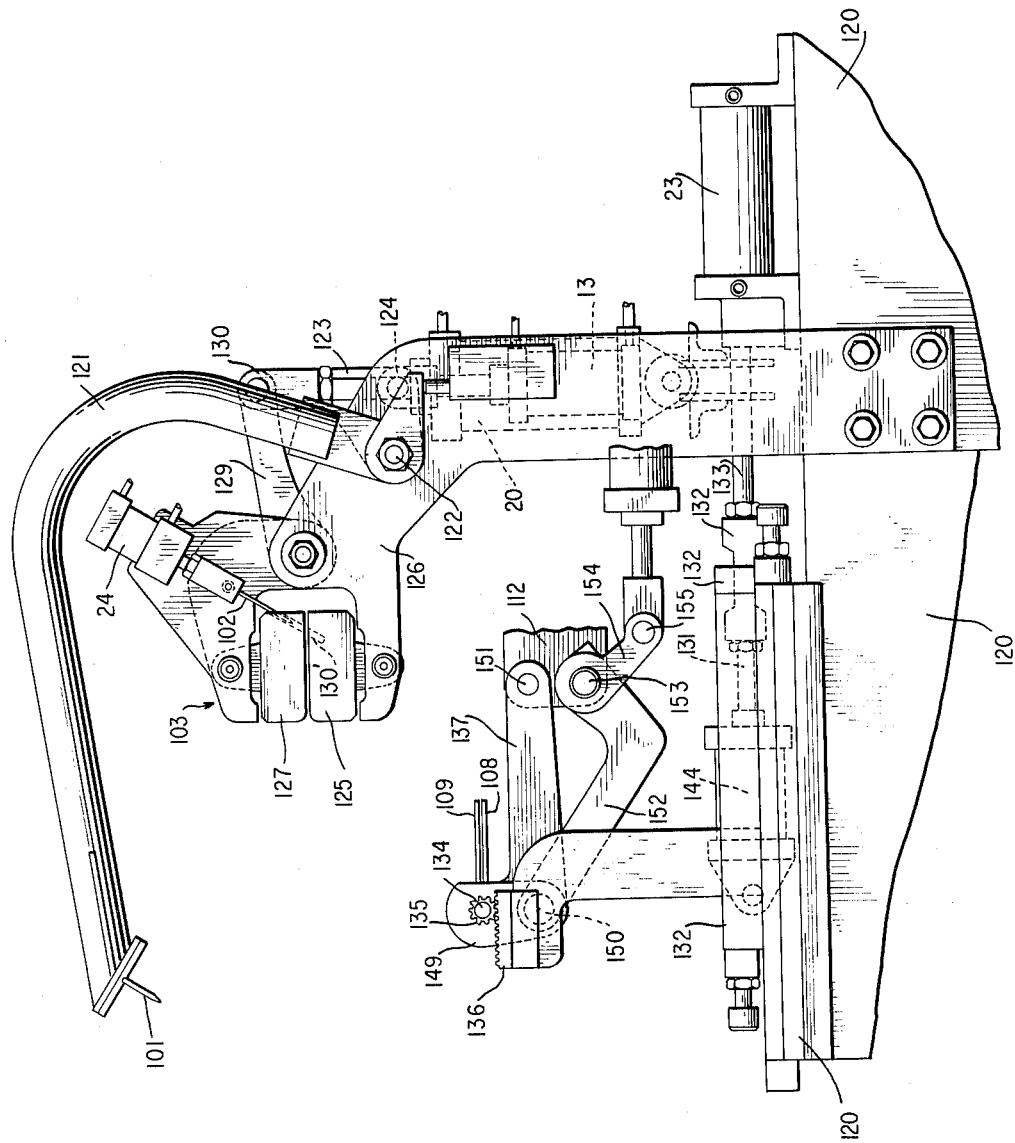

June 21, 1966 C. D. WILLIAMSON 3,257,663
CUFF MAKING MACHINE

Filed Dec. 20, 1961 17 Sheets-Sheet 10

INVENTOR
C. DICKIE WILLIAMSON

BY Mead, Browne, Schuyler & Beveridge
ATTORNEYS

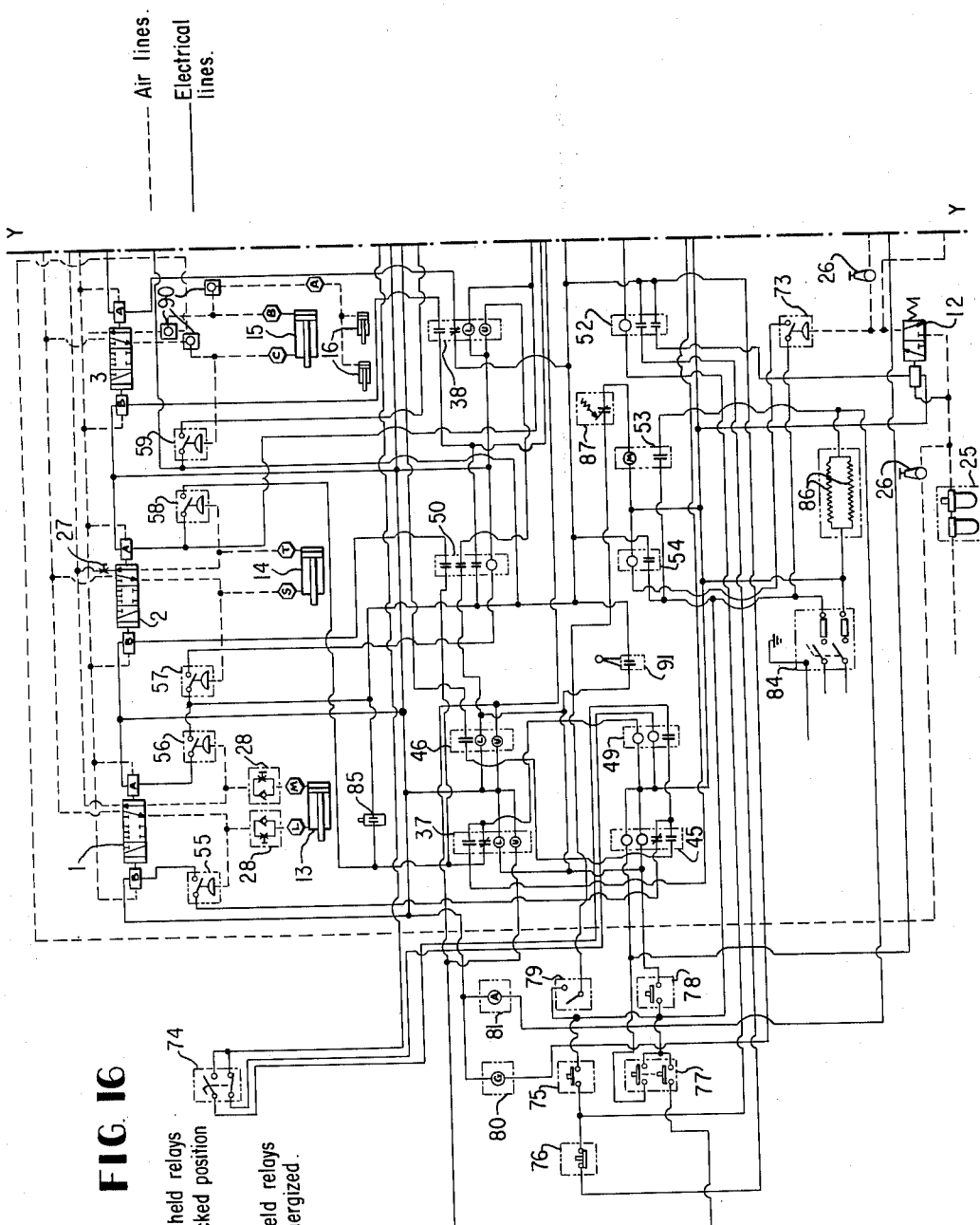

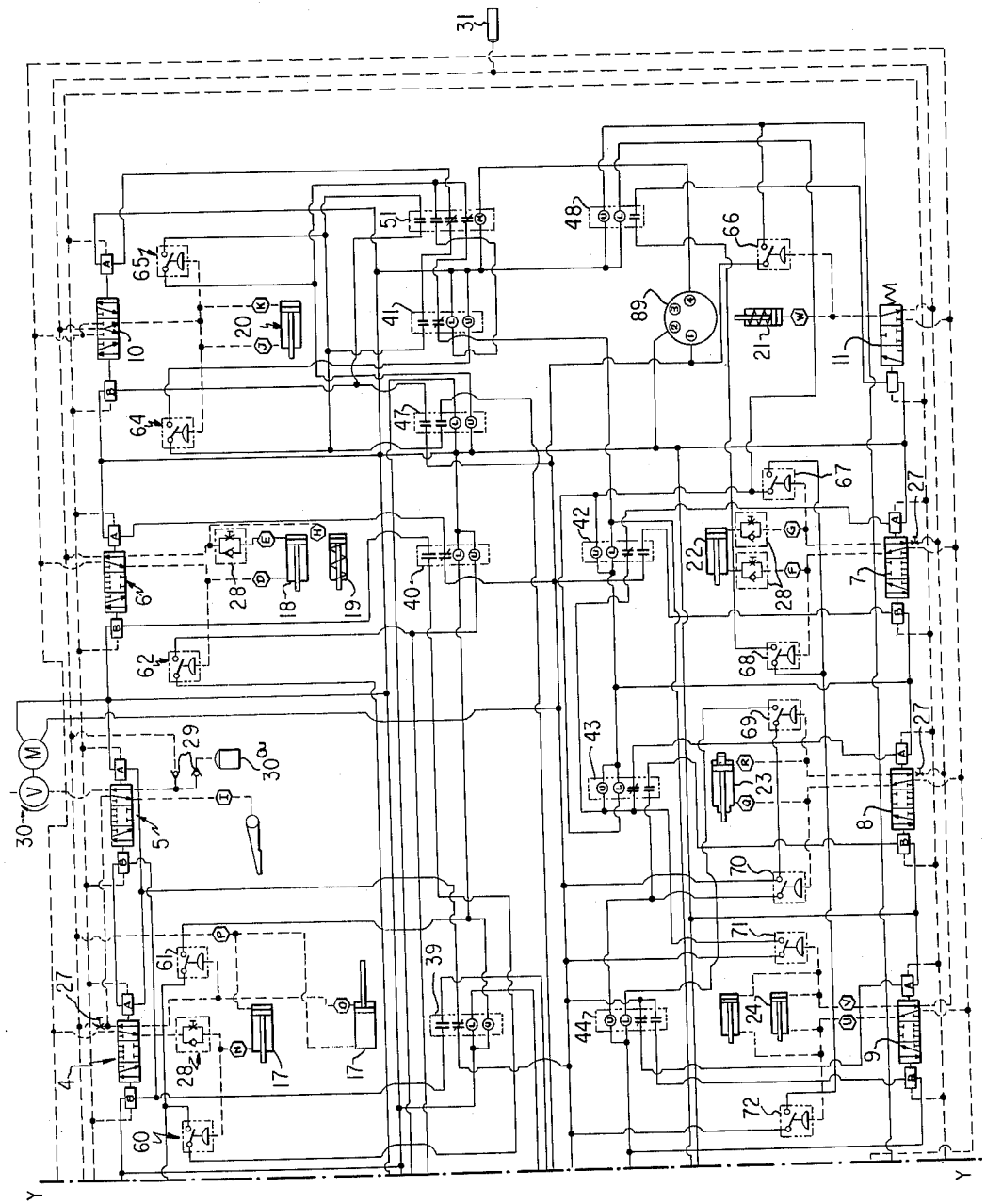

——— Denotes common side of circuit.
———— Denotes control side of circuit at start of cycle I.
——— Denotes electrical lines connecting control elements across common and control sides.
- - - Denotes air lines.

INVENTOR.
C. DICKIE WILLIAMSON
BY
Mead, Browne, Schuyler & Beveridge
ATTORNEYS

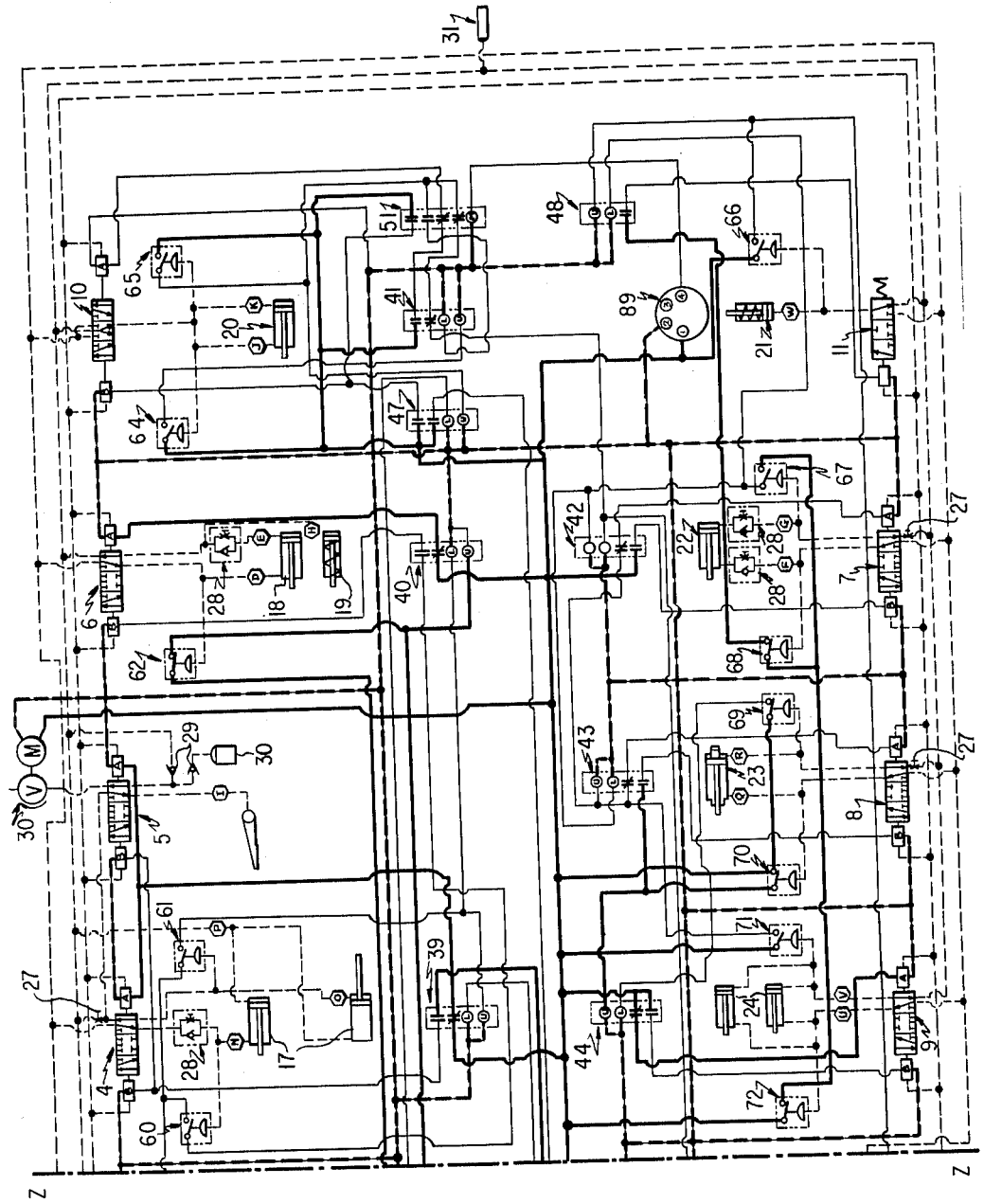

June 21, 1966  C. D. WILLIAMSON  3,257,663
CUFF MAKING MACHINE

Filed Dec. 20, 1961  17 Sheets-Sheet 15

CYCLE I

INVENTOR.
C. DICKIE WILLIAMSON
BY
Mead, Browne, Schuyler & Beveridge
ATTORNEYS

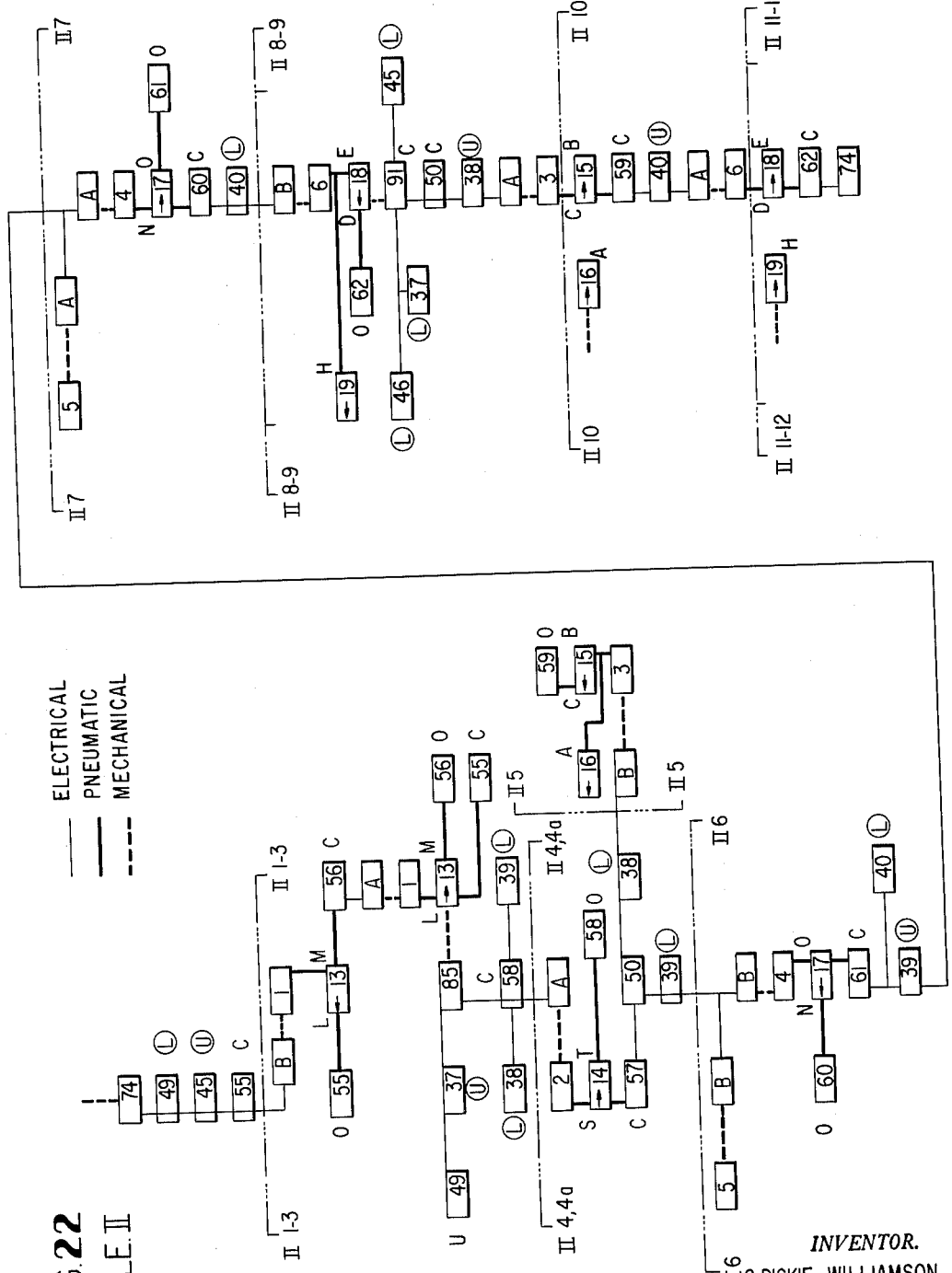
FIG. 22 CYCLE II

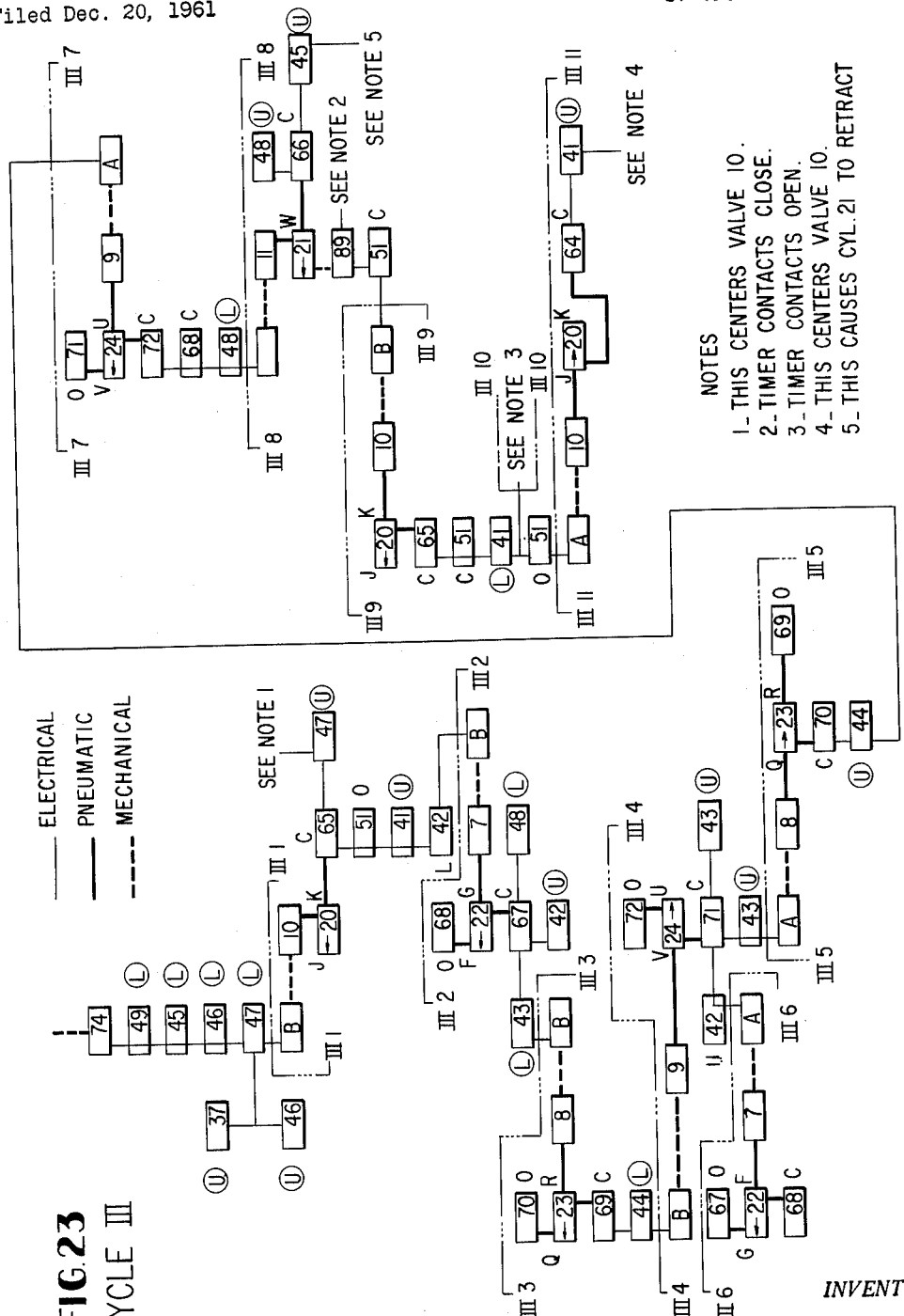

United States Patent Office 3,257,663
Patented June 21, 1966

3,257,663
CUFF MAKING MACHINE
Charles Dickie Williamson, Fort Worth, Tex., assignor to The Williamson-Dickie Manufacturing Company, Fort Worth, Tex., a corporation of Texas
Filed Dec. 20, 1961, Ser. No. 160,817
39 Claims. (Cl. 223—2)

This invention relates to an improved method and apparatus for forming and arranging individual fabric blanks and fabricating these blanks into a finished multi-ply fabric unit and is particularly adapted to producing finished shirt cuffs.

Various machines have been utilized in the industry for cutting, shaping, and pressing the individual blanks which form the plies of fabric units such as cuffs, flaps, and like parts which are attached to garments such as shirts. These machines cut, shape and press the individual plies into the proper shape and condition for assembling and being sewn together to form the unitary article which is attached to the garment. However, after cutting and shaping the individual plies, it has previously been the practice to complete the article by stitching the plies together, usually along the edge hems. Obviously considerable economies could be realized if these multiple plies of cloth, which are assembled to create garment parts such as cuffs, could be formed to the proper shapes and bonded together in their final finished form in a single machine.

An object of this invention is to provide an improved method for forming and assembling oversize blanks of cloth into finished multi-ply hemmed fabric articles, such as cuffs or similar garment components, without having to stitch the plies together.

Another object is to provide an apparatus whereby oversize blanks of cloth, from which cuffs and like garment components are formed, may be shaped and assembled into a multi-ply hemmed article by automatic, sequential operations of the apparatus.

Yet another object is to provide an apparatus for assembling the multiple plies of cloth, comprising cuffs and like components for garments, without having to stitch the plies together.

A further object is to provide an apparatus in which oversize fabric blanks may be folded to form hems and arranged in the proper relationship for producing a multi-ply hemmed fabric article.

Still a further object is to provide an apparatus for bonding together into an integral unit without the use of sewing at least two plies of fabric which have folded hems along the edges.

Other objects and advantages of the invention are obvious from the following specification and drawings in which there is disclosed this improved method and one selected embodiment of the apparatus.

The present invention provides a method and an apparatus whereby multiple cloth blanks may be individually shaped, aligned and bonded together in a finished form without having to sew the plies together. Specifically, the configuration and method disclosed below makes it possible to form a finished shirt cuff made from two plies of cloth in an unbroken sequence of operations. The operation involves two identically shaped blanks of cloth which have been cut oversize to allow for hems, folding the blanks as described to establish hems around all edges, placing the blanks in a matching, overlying position with the hems facing inwardly, inserting a strip of thermo-plastic between the folded blank to substantially cover the cloth surface, and binding the plies together by the adhesive action of the plastic through the application of heat and pressure. This not only saves the added step of stitching the garment together, a separate time-consuming operation, but permits a finished cuff, or other article, to be economically produced by automatic processing in a single machine operated by an unskilled operator.

FIGURES 2-11 show, in simple schematic form, the eleven major units of the machine, which carry out the cuff-forming process, and the various positions and movements required of these units in the cuff forming sequence.

FIGURE 12 is a plan view of a simplified structure of the machine.

FIGURE 14 is a simplified partial side elevation of a machine structure approximately along the plane 14—14 of FIGURE 12.

FIGURES 16 and 17 represent the basic electrical and pneumatic circuit diagram, FIGURE 16 being the left side and FIGURE 17 the right side, the diagrams joining along the line Y—Y.

FIGURES 18 and 19 represent the circuit diagram as in FIGURES 16 and 17 joining at Z—Z with the control circuits energized and the machine in operable condition.

FIGURES 20-23 are charts graphically outlining the sequence in which each of the electrical and pneumatic control units are energized or actuated during each of the cycles of the machine operations.

Figure 1:
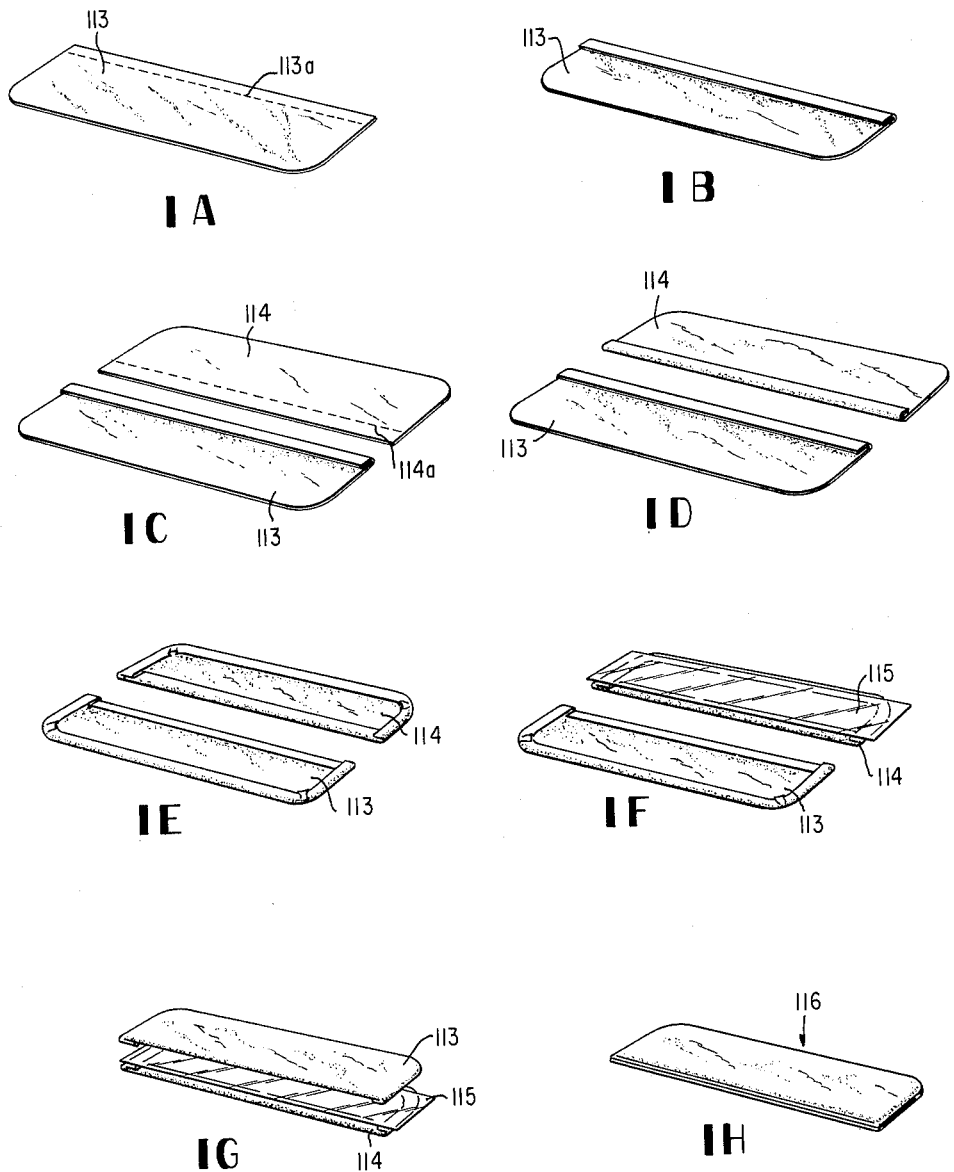
FIGURE 1 represents the shape and configuration of the cloth blanks in the various stages of assembly in forming a finished cuff.

In the descriptive matter which follows, first a description is given of the skeletonized, general arrangement of the eleven major units of the machine which cooperate to fold and assembly the cuff blanks into the final product; next the operational steps of the machine are described in terms of the operation of the eleven major units of the machine, which individually function in sequence to shape and assemble the cuff blanks step-by-step to create the finished article; next, the basic physical configuration of the machine will be described in terms of a simplified structure which indicates the physical relationship of the components which comprise these basic units to indicate how these various components are actuated so that the basic units function as previously outlined in the operational steps; and lastly, the operation of the electrical and pneumatic circuits will be described indicating how the various electrical and pneumatic control units function to initiate each step of the sequence of operations for each of the operating cycles of the machine.

GENERAL ARRANGEMENT OF MAJOR UNITS

The following comprise the eleven major units of the machine which perform the various steps in shaping and assembling the final article. They may be identified from FIGURE 2, which schematically shows these major components detached from their actuators and illustrates their general relationship to one another. The numbers correspond to those by which the parts are identified on the figures.

101, creaser blade
102, needles
103, bonding iron
104, plastic positioner
105, stationary platen
106, closing platen
107, corner creasers 108, primary mandrel
109, secondary mandrel
110, plastic roll
111, plastic loop blade The stationary and closing platens 105 and 106, the corner creasers 107, the primary and secondary mandrels 108 and 109, the plastic roll 110 and the plastic loop blade 111 are mounted on a single structure which is free to move horizontally forward and rearward as a unit, this structure being referred to as the platen carriage assembly 112.

Before describing the various operations of these major units, listed above, which form the finished cuff, the physical location of these components relative to one another can best be understood by referring to FIGURES 2 and 3 in connection with the description immediately following.

The vertically movable creaser-blade 101 lies above and roughly over the center portion of the flat bed formed by the two abutting flat platens 105 and 106. The rear stationary platen 105 and the forward, rotatable, closing platen 106 normally lie with one edge in an abutting relationship to form a single flat bed on which the cuff blanks are folded to their final shape, as described below. The bonding iron 103, which has two pivoting jaws, lies above and somewhat to the rear of the normal position of the platens. The plastic positioner 104 lies above the stationary platen 105 to be positioned over the end of the plastic strip which extends from the roll 110 and rests on one end of the stationary (rear) platen 105.

Two flat mandrels, primary mandrel 108 and a secondary mandrel 109, are arranged in an abutting relationship on the top surface of the central portion of the bed formed by the platens. These two mandrels are hinged along their abutting side so as to be separately rotatable about their common side to permit each mandrel to be rotated to overlie the other in a matching relationship. The hinge line of the mandrels is substantially coincident with and above the common abutting edge of the two platens. The outer portions of the non-abutting edges of each mandrel corresponds to the final shape and size of the finished cuff. In the illustrated configuration, each mandrel is split into two components which lie side by side but they operate together as a unit.

Four corner creasers 107 lie on the top surface of the bed formed by the platens 105 and 106 to surround the mandrels. The inside boundaries of the pair of corner creasers lying on each platen are shaped to correspond approximately to the outside dimensions of the rough-cut cuff-ply 113 or 114, so that the ply will fit within the inner boundary of a pair of corner creasers as indicated in FIGURE 2. The space between the inside boundary of the pair of corner creasers and the outer edge of the mandrel which lies within that pair of creasers is approximately equal to the width of the hem to be formed on the corresponding edge of each cuff-ply. The stationary and closing platens 105 and 106, the corner creasers 107, the two mandrels 108 and 109, the plastic roll 110 and the plastic loop blade 111 are supported by a common unit, referred to as the platen carriage assembly 112, which is free to move in a horizontal plane forward and rearward as a single unit.

Since the purpose of the plastic strip is to act as a bonding medium, a number of different types would be suitable. Polypropylene clear film three mils thick has been effectively utilized. The bonding time and temperature vary with the type of adhesive used and the color and weight of cloth. A typical bonding time and temperature for three mil polypropylene when used to bond 5.5 oz. tan twill is six seconds at 425° F.

OPERATIONAL STEPS

The major components of the machine cooperate and function in a manner to form a finished cuff 116, illustrated in FIGURE 1H, from the flat blanks of cloth corresponding to the shape 113 in FIGURE 1A. The various functions performed by these major units in forming the finished cuff may be understood by referring to FIGURES 2–11 in the following discussion wherein the sequential steps in forming the cuff are tabulated. In following the various steps in the three cycles of the machine, the figure which illustrates the motions of the various major components is indicated in parenthesis ahead of the steps to which the figure refers. The entire operation is divided into three cycles, with each cycle operation further broken down into sequential steps which are described in terms of the movement or function performed by each individual unit.

Cycle I
(FIG. 2)

(1) Operator places a rough-cut cuff blank 113, of the shape indicated in FIGURE 1A, on the closing platen 107 within the inner boundaries of the pair of corner creasers 107 overlying the closing platen 106. Both mandrels, 108 and 109, rest in an overlying position on top of the stationary platen 105.

(2) Creasing blade 101 descends as indicated by arrow A–1, to its lower position 101a, indicated in phantom lines, to contact the cuff blank 113 along the dotted line 113a as indicated in FIG. 1A. This creases the blank to create an upwardly extending flap along the crease line.

(3) Creasing blade 101 returns to its up-position in the direction of the arrow A–2.

(4) Platen carriage 112 moves forward in the direction of arrow B–1 to the position indicated in phantom lines.

(5) Both mandrels 108 and 109 are rotated in the direction of arrow C–1 to the closing platen side to rest on top of the cuff blank 113 and press the upwardly extending flap formed on the blank back over the blank along the crease line 113a to form a hem on the blank 113 as indicated in FIGURE 1B.

Cycle II
(FIG. 4)

(1) Operator places the other rough cut cuff blank 114 on the stationary platen 105 within the framing formed by the pair of corner creasers 107 attached to the stationary platen 105. The two cuff blanks 113 and 114 will now be lying on the platens in the configuration shown by FIGURE 1C. The cuff blank 114 now lies beneath the creasing blade 101 due to the forward position of the platen carriage assembly 112.

(2) Creasing blade 101 descends in the direction of arrow A–1 to crease the cuff blank 114 along its base edge indicated by the line 114a in FIG. 1C.

(3) The creasing blade 101 is raised to the up position in the direction of arrow A–2.

(4) Platen carriage 112 is moved back to its initial position indicated in phantom lines in the direction of arrow B–2.

(FIG 5)

(4a) The rearward motion of the platen carriage assembly 112 in the direction of the arrow B–2, above, rotates the primary mandrel 108 only in the direction indicated by the arrow C–2 to a position on top of cuff blank 114 on the stationary platen 105 as indicated in phantom outline 108a and fold the flap on blank 114 back along the crease line 114a beneath the mandrel. The secondary mandrel 109 remains on top of the other cuff blank 113 the closing platen 106. The two blanks, 113 and 114, at this time are in the configuration shown in FIGURE 1D with a mandrel lying on top of each of the blanks.

(FIG. 6)

(5) The four-corner creasers 107 each move diagonally inwardly toward the center point of the mandrel hinge line in a direction of the arrows D–1 from their original position as indicated in phantom lines to slightly overlie the outer edges of the mandrels. This folds the other three unfolded edges of the cuff plies 113 and 114, which had protruded beyond the edges of the mandrels around the outer edges and over the top of the respective overlying mandrels to form a hem on the remaining edges of each cuff and shape the blanks to the form as indicated in FIGURE 1E.

(6) The plastic positioner 104, through a vacuum pickup on the lower side of its arm picks up the end of the plastic strip from the roll 110 which lies over the end of the stationary plate 105, strokes in a direction of arrow E–1, to the other side of the platen to the position 104a indicated in dotted lines to place a length of the plastic strip 115 on top of primary mandrel 108 and the corner creasers. The cuff components are now in the condition indicated in FIGURE 1F.

(7) The plastic positioner 104 drops the plastic strip and then returns to its original position in the direction indicated by the arrow E–2.

(FIG. 7)

(8) The closing platen 106 is rotated in the direction indicated by arrow F–1 to a position overlying the stationary platen 105 as indicated in the phantom lines 106a. The plastic strip is sheared by the inner mating edges of the corner creasers as the two sets of corner creasers come in contact. The cuff components, including the plastic strip 115, now overlie one another in the sandwich type relationship indicated in FIGURE 1G.

(9) The plastic loop blade 111 descends in the direction of arrow G–1 to its lower position 111a, indicated in phantom lines, to form another bight in the plastic strip.

(10) The corner creasers are diagonally withdrawn to their outward positions in a direction of arrows D–2.

(FIG. 8)

(11) The closing platen 106 is rotated back to its original position 106a, as indicated in phantom lines, in the direction of arrow F–2. This leaves a stack on top of the stationary platen 105 which is arranged vertically upward in order: stationary platen 105, cuff blank 114, primary mandrel 108 having the three edges of the blank 114 folded around it, the plastic strip 115, the secondary mandrel 109 with the edges of the other blank 113 folded beneath it, and lastly the cuff blank 113. The top cuff blank 113 is held in place over the secondary mandrel 109 since three of its edges are folded around the mandrel and clamped under it. The mandrels are spring-loaded and clamped together thus tightly holding the plies and plastic strip to the mandrels.

(12) The plastic loop blade 111 is raised to its top position as indicated in phantom lines in the direction of arrow G–2.

*Cycle III*

(FIG. 9)

(1) The jaws of the bonding iron 103 partially close in the direction of the arrow H–1 and hold under light pressure as indicated in the phantom lines 103a.

(2) The mandrels 108 and 109, along with the cuff blanks folded around with the edges clamped between the mandrels, are raised from their normal position on the indicated stationary platen as in phantom lines, in the direction of the arrow J–1 to a position horizontally in line with the partially-closed bonding iron as indicated in the solid lines.

(FIG. 10)

(3) the entire platen carriage assembly 112 moves rearwardly from its normal forward position 112a, as indicated in the phantom lines, in a long stroke in the direction of arrows K–1 to the overposition 112 shown in solid lines. This horizontal rearward motion of the carriage assembly 112 carries the mandrels from their forward position ahead of the bonding iron, as indicated in phantom lines 108a and 109a, and inserts them, along with the folded cuff blanks, between the jaws of the bonding iron 103 at the position indicated by 108 and 109.

(4) The needles 102 are extended downwardly into holes through the bonding iron 103 to pierce the edges of the folded cuff blanks 113 and 114 in the inserted position indicated in the dotted line 102a.

(FIG. 11)

(5) The entire platen carriage assembly 112 is moved forward in the direction of arrow K–2 from its rear position 112a, indicated in phantom lines, in a long stroke to its normal mid-position 112. The forward motion of the platen carriage assembly removes the mandrels 108 and 109 from between the jaws of the bonding iron 103 and moves them forward to the position indicated in phantom lines 108a and 109a. The folded cuff plies 113 and 114, along with the plastic strip 115, are retained within the jaws of the bonding iron 103 by the needles 102.

(6) The mandrels 108 and 109 are lowered in the direction of the arrow J–2 to their starting position on top of the stationary platen 105, as indicated by the outline in solid lines.

(7) The needles 102 are withdrawn from the bonding iron to this retracted position.

(8) The bonding iron timer is energized.

(9) The jaws of the bonding iron 103 are clamped together under pressure (the pressure can be regulated). The heat and pressure from the bonding iron bonds the plastic strip to the opposing hems and surfaces of the plies 113 and 114 to form a single finished cuff 116, shown in FIG. 1H.

(10) The bonding iron timer de-energizes.

(11) The jaws of the bonding iron 103 open and the operator may remove the finished cuff 116, which is in the final form as illustrated in FIGURE 1H, from the jaws of the bonding iron.

SIMPLIFIED MACHINE DESCRIPTION

This completes the discussion of the operational steps by which the finished cuff is formed. The following discussion deals with a simplified semi-schematic configuration of the machine indicated in FIGS. 12–15.

FIGS. 12–15 illustrate the mechanical action, physical relationship and means of actuating the previously listed major units of the machine, which sequentially function in accordance with the steps outlined above in the three operating cycles which form the finished cuff.

Figure 13:
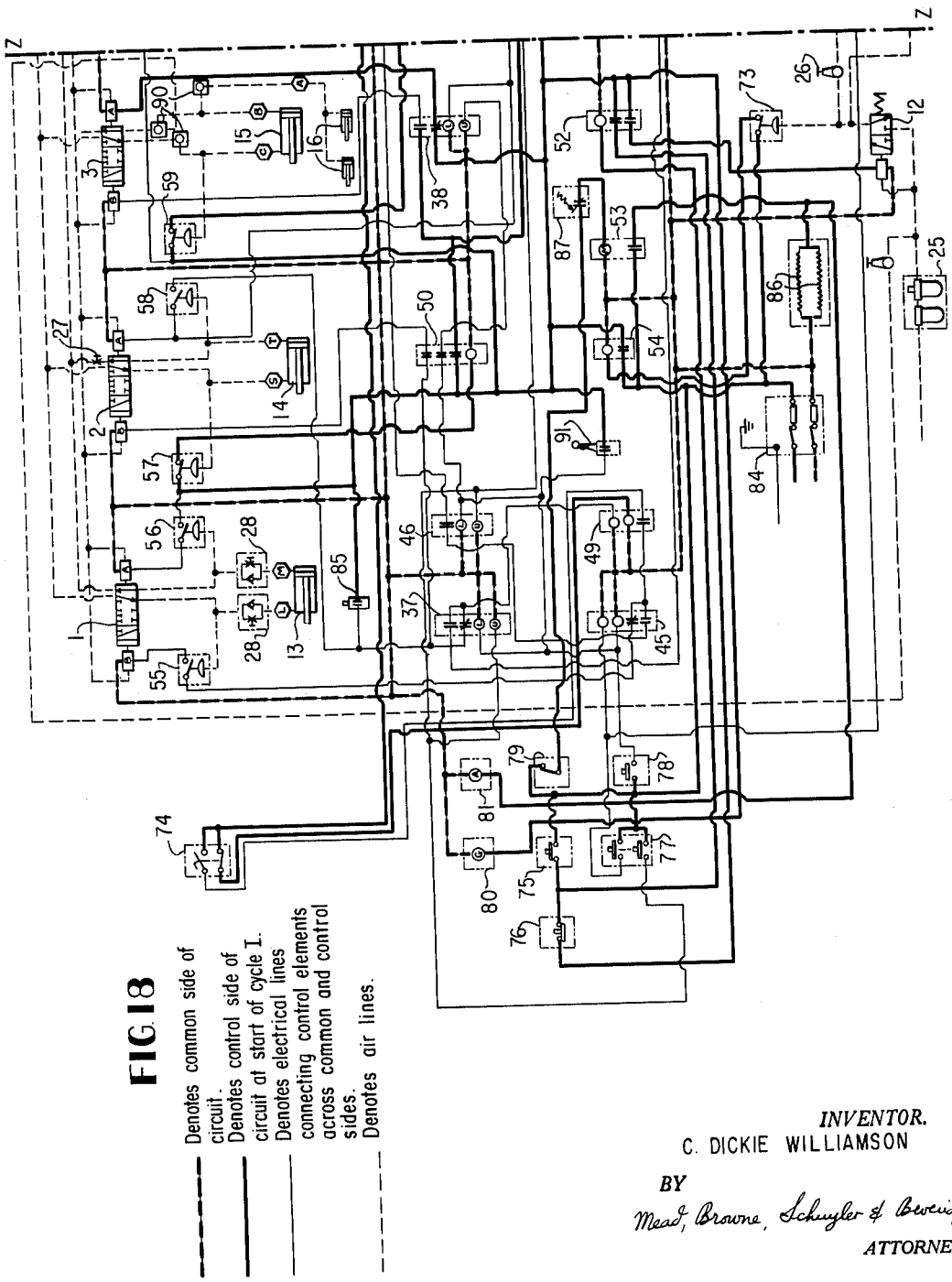
FIGURE 13 is a partial side elevation of a simplified machine structure along the plane 13—13 indicated in FIGURE 12.
Figure 20:
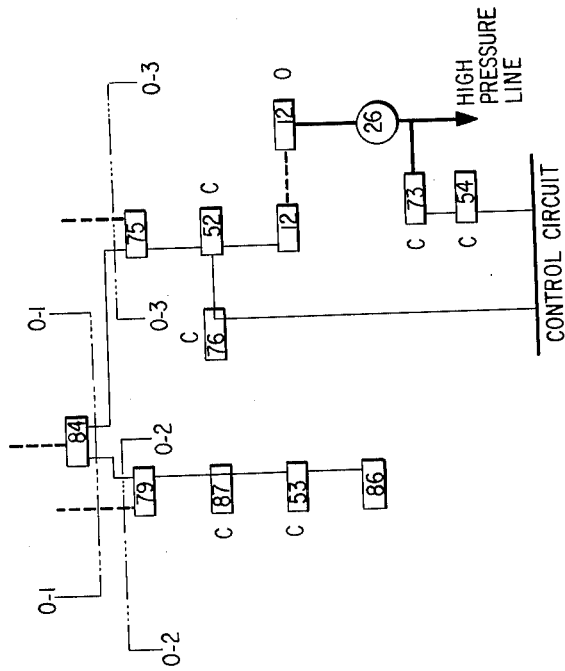
Figure 21:
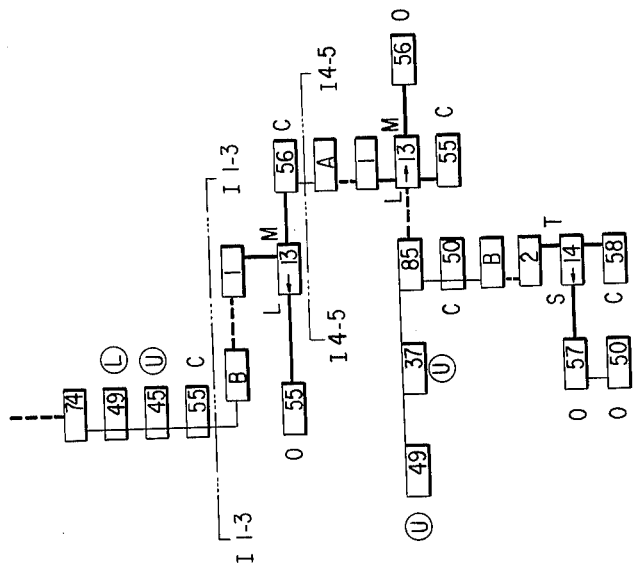

First refer to FIGS. 13 and 14. The following basic units are mounted rigidly on the foundation 120 of the machine: Creaser blade 101, bonding iron 103, and plastic positioner 104. The needles 102 are carried by the bonding iron 103. The creaser blade 101 is mounted at the outer end of the curved arm 121 which is pivotally attached at the other end to a vertical extension 126 of the machine foundation 120 at the pivot 122. From this pivot point 122, the creaser arm 121 connects through a short extension arm 123 to the outer end 124 of the vertical piston rod which connects at the other end to the piston within the creaser actuating cylinder 13, as best illustrated in FIG. 13. Extension of the piston within the creaser cylinder 13 raises the intermediate arm 123 to rotate the creaser arm 121 around the pivot 122 and lower the creaser blade 101 to the down position indicated in FIGURE 13. The creaser blade is raised to the up position indicated in FIGURE 14 by retracting the piston within the creaser cylinder 13.

Figure 15:
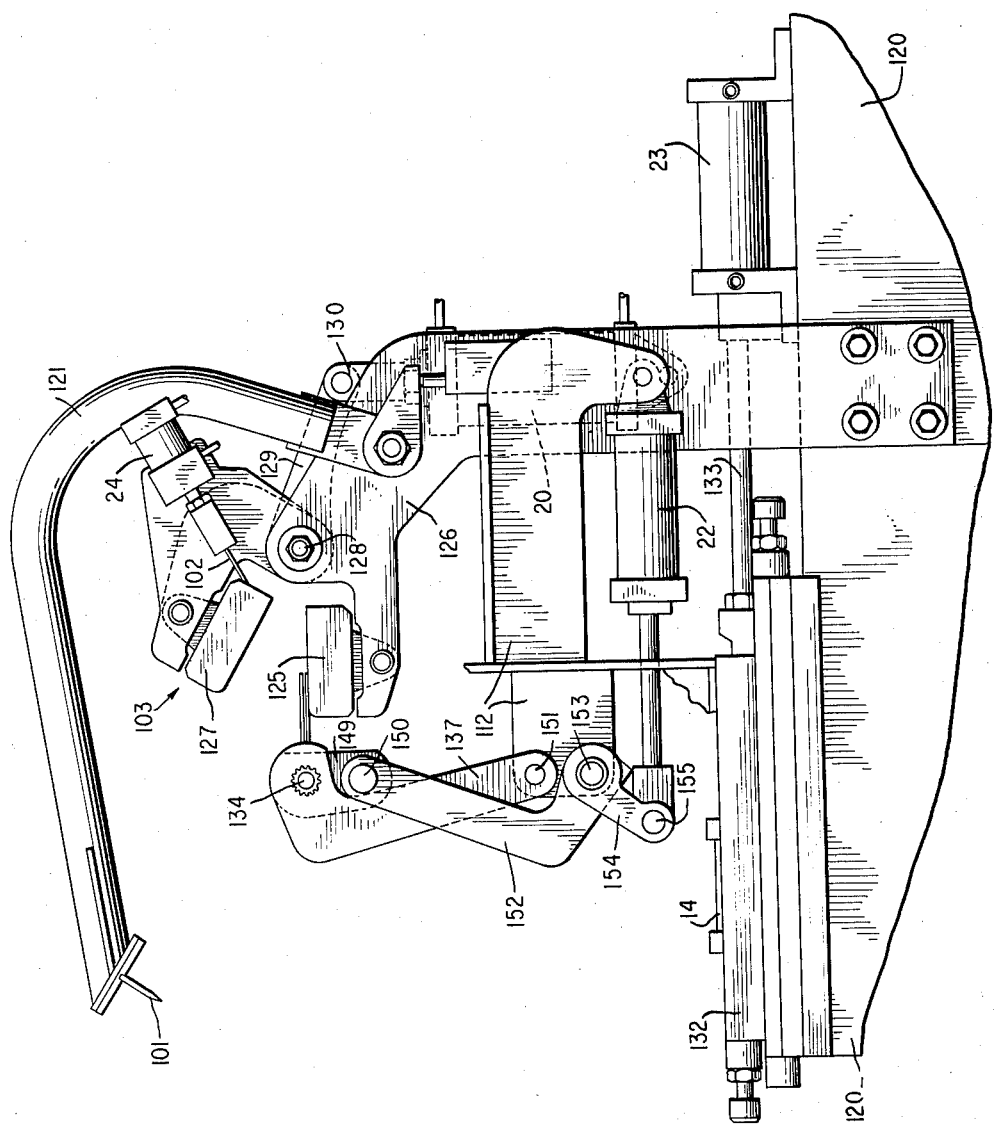
FIGURE 15 is a partial side elevation substantially conforming to FIGURE 14 but with certain components of the machine in different operational positions.

Referring now to FIGS. 14 and 15, the bonding iron 103 has a lower stationary lower jaw 125 rigidly mounted to the vertical extension 126 of the foundation 120 of the machine, and a movable upper jaw 127 pivotally connected at pivot 128 to the vertical bed extension 126. The upper jaw 127 connects through the pivot 128 and the upper jaw extension arm 129 to the upper end 130 of the vertical piston rod connected at the other end to the piston in the bonding iron cylinder 20. FIGURE 15 indicates the bonding iron with the jaws in the open position. FIGURE 14 indicates the jaws in the closed position through the upward extension of the piston in the bonding iron cylinder 20 moving the end 130 of the piston rod which rotates the connecting arm and the upper jaw 127 around the pivot point 128.

As indicated in FIGURE 14 the upper end of the two needles 102 are connected to the piston of the needle cylinder 24 which is mounted on the structure supporting the upper jaw 127 of the bonding iron 103 and moves with the upper jaw. When the pistons within the needle cylinders 24 are extended, the needles 102 are moved downwardly into the holes 130 bored through the jaws of the bonding iron to pierce the folded cuff plies which are folded around the mandrels and lying between the jaws. The holes 130 are so located that the needles will pierce the cloth plies but not the mandrels around which the plies are folded. The retraction of the pistons in the bonding iron cylinders 24 withdraws the needles 102 from the bonding iron.

Refer now to FIGS. 12-14. The platen carriage assembly 112 is a horizontally movable structure which carries the platens 105 and 106, the four corner creasers 107, the mandrels 108 and 109, the plastic loop blade 111 and the plastic loop 110. This platen carriage assembly 112 is attached to the horizontally mounted short stroke cylinder 14 located beneath the platens, and is moved horizontally to the forward position from the normal mid position by the action of the piston in the short-stroke cylinder 14. The piston rod 131 of the piston in the short-stroke cylinder 14 is connected to an intermediate carriage 132 which rides horizontally on the machine foundation 120. The rear of the intermediate carriage 132 is connected to the outer end of the piston rod 133 of the piston in the long-stroke cylinder 23 which is rigidly attached to the machine foundation 120 at the back of the machine. Thus, as indicated in FIGURE 13 the platen carriage assembly 112 is horizontally movable with respect to the intermediate carriage 132 and will move to the forward dotted position 112a by the extension of the piston in the short stroke cylinder 14 which moves the short stroke cylinder (and the platen carriage assembly) forward to the dotted position 14a. By this means the two platens are alternatively positioned vertically beneath the creaser blade 101 for creasing the two cuff plies as described previously.

Refer now to FIGS. 12 and 14. The mandrels 108 and 109 normally rest on the mid area of the platen and both pivot about the axis of the mandrel rod 134. The primary mandrel 108 is keyed to rotate with rod 134 while the secondary mandrel 109 is free to rotate about the rod 134. One end of the mandrel rod 134 is keyed to a pinion 135 which rests on the horizontal rack 136. The rack 136 is rigidly connected to the intermediate carriage 132. The mandrel rod 134 is journaled within and supported at the ends by one end of the bell crank 137 which is rigidly pivotally attached at the other end to the platen carriage structure 112. This structure will be described in more detail below. Thus, when the platen carriage 112 is moved to the forward position by the action of the short-stroke cylinder 14, the mandrel rod 134 will be rotated in a forward direction by the action of the teeth in forward moving pinion 135 meshing in the teeth of the stationary rack 136, which is attached to the non-moving intermediate carriage 132. The rotation of pinion 135 will rotate the mandrel rod 134 about its axis and the primary mandrel 108 will be shifted from its prior position on top of the stationary platen 105, as indicated in FIGURE 14, to the forward position 108a over the closing platen 106, indicated in dotted lines in FIGURE 13. This rotating action of the lower primary mandrel 108 will carry the overlying secondary mandrel 109 with it to rest on top of the closing platen 106. Spring means, not shown, clamp the two mandrels 108 and 109 together when they are in the position over the stationary mandrel indicated in FIGURE 13. This spring clamping means is released when the platens are rotated over to the closing platen side, so that when the platen carriage 112 is moved back to its original mid position the rotation of the mandrel rod 134 by the action of the moving pinion 135 along the stationary rack 136 will rotate the primary mandrel 108 only back to the stationary platen side. The secondary mandrel 109 not being keyed to the mandrel rod 134 will remain on top of the closing platen 106.

To understand the rotating action of the platens refer to FIGURES 12 and 13. The stationary platen 105 is rigidly horizontally mounted to the platen carriage assembly 112. The closing platen 106, lying on the opposite side of the stationary platen 105 is likewise supported by the platen carriage assembly 112 but is journaled to rotate about the side which abuts the stationary platen 105 along an axis coincident with the axis of the mandrel hinge rod 134. The right end of the closing platen is supported through the L extension 166 which terminates at the extreme right in shaft 137 having its axis in line with mandrel rod 134. A pinion 138 is keyed concentrically around the shaft 137 of the closing platen extension and rests on the horizontal rack 139. The horizontally movable rack 139 is connected to the outer end 140 of the piston rod which attaches to the piston of the horizontally mounted platen closing cylinder 18. Thus the actuation of the piston in the closing platen cylinder 18, which is rigidly mounted on the platen carriage assembly 112, will rotate the forward closing platen 106 about the axis of the shaft 137 which is coincident with the axis of mandrel rod 134 and place it in a position to overlie the stationary platen 106 through the motion of the horizontal rack 139 which meshes with the teeth of pinion 138 to rotate the pinion.

Refer now to FIGURE 12. The four corner creasers 107 overlie and are attached to the platens 105 and 106 by means of pins 141 in the slotted holes 142 of the corner creasers 107, thus providing a limited freedom of horizontal motion for the corner creasers in the diagonal directions of the centerlines of the slots 142. The inner boundary of the pair of corner creasers overlying the stationary platen 105 have a raised lip 170 which fits into a groove 171 around the inner boundary of the other pair of corner creasers over the closing platen 106 (see FIG. 10), thereby providing a cutter to sever the plastic strip 115 along the inner boundary line of the corner creasers when the closing platen 106 is rotated over the top of the stationary platen 105. This trims the plastic strip 115 to remain within the confines of the finished cuff shape. The pair of corner creasers overlying the stationary platen 105 are each pivotally attached by the pin 143 to one end of each of the bell cranks 144 which are pivoted about this central portion by the pin 145. The other end of the crank arms 144 are attached to the outer end 146 of the piston rod of the piston of the large creaser cylinder 15 by means of pin 147 riding in the slots of the bell cranks 144. When the piston of the large creaser cylinder 15, which is mounted to the platen carriage assembly 112, is extended, the extension of the rod 141 will rotate the crank arms 144 about the pivots 145 and push the rear, two corner creasers diagonally towards the center point of the bed formed by the two platens in the direction of the center lines of the slots 142 so that the inner edges of the creasers override the outer edges of the mandrel 108 which lies within the corner creasers. Each of the outer two corner creasers, overlying the closing platen 106, are attached to one end of each of the two piston rods 148 which connect at the other end to the pistons of the two small creaser cylinders 16, which are diagonally aligned in the direction of the center line of the slots 142 in the outer pair of corner creasers. The piston rods 141 ride against the pressure of springs 156 which normally keep the pistons of the small corner creasers cylinder 16 in the retracted position except when extended by hydraulic pressure within the cylinder. Thus the extension of the pistons within the cylinders 16 under hydraulic pressure will diagonally move both of the outer creasers, overlying the closing platen, diagonally inwardly to overlie the edges of the mandrel 109 in the same manner on the inner pair of corner creasers. This diagonal inward motion of the corner creasers will fold the edges of the blanks protruding beyond the edges of the overlying mandrel over the mandrel which is encompassed within the boundaries of the corner creasers. The unfolded cuff blank should fit within the contour of each set of corner creasers when retracted. Their position is adjustable (means not indicated) so that the cuff size may be varied.

The action of the parallelogram linkage which raises the mandrels upwardly from the plane of the platens to a plane in line with the jaws of the bonding iron 103 is best understood by reference to FIGURES 14 and 15. The mandrel rod 134, near its extremity, extends through but is rigidly attached to the top end of link 149, whereas the extension of the mandrel rod 134 beyond the link 149 is journaled within and supported by the outer end of the top crank arm 137. The inner end of the top crank arm 137 is pivotally attached to the platen carriage assembly 112 by the pin 151. The lower end of the link 149 is pivotally connected to the outer end of the bottom crank arm 152 by the pin 150. The inner end of the bottom crank arm 152 is pivotally connected to the platen carriage assembly 112 by the pin 153. The inner end of the bottom crank arm 152 has an extension 154 which extends below the pivot 153 and is pivotally connected to the extremity 155 of the piston rod which connects at the other end to the piston of the mandrel cylinder 22, which is supported by the platen carriage assembly 112. By referring to both FIGURES 13 and 14 it can be seen that the linkage established by the link 149, and its supporting crank arms 137 and 152, which have their inner ends rotatably pinned to the platen carriage by the pins 151 and 152, is a conventional parallelogram linkage in which the fixed support side of the parallelogram is the line 151-153, the opposite moving side is the link 149, and the other two opposite, moving sides of the parallelogram are the crank arms 137 and 152. Thus extension of the piston in the mandrel cylinder 22 rotates the parallelogram linkage from its lower position indicated in FIGURE 14 to the upper position indicated in FIGURE 15 but maintains the link 149 parallel to its original position so that the mandrels remain in the horizontal plane when raised to the level of the bonding iron 103.

The mandrels, carrying the folding cuff blanks, are moved rearwardly to be entirely within the jaws 125 and 127 of the bonding iron by rearward motion of the piston rod 133 through reaction of the piston of the long-stroke cylinder 23, thus moving the intermediate carriage 132 and the entire platen carriage assembly 112, along with the elevated mandrels, from its normally forward position, indicated in FIGURE 14, rearwardly to insert the mandrels between the jaws of the bonding iron 103.

As best illustrated in FIGURE 12, the plastic positioner 104 is carried by a movable carriage 156 which is slidably mounted on the transverse rod 157 overlying the stationary platen and which is attached to the machine bed foundation 120 to extend transversely across the machine formed by the platens so that the plastic positioner 104 may be stroked over the top of the primary mandrel 108 for positioning the plastic strip 115 over the mandrel and underlying folded fabric blank as previously described. One end of a cable 158 is attached to the left side of the plastic positioner carriage 156. The cable 158 is carried over the pulley 159 and attaches at its other end to the vertically moving rod of the piston for the left plastic positioner cylinder 17. The right side of the plastic positioner carriage 156 is likewise attached to the end of cable 160 which lies over pulley 161 with the other end attached to the piston of the right hand plastic positioner cylinder 17a. The piston of the left plastic positioner cylinder 17 is retracted when the piston in the right cylinder 17a is extended, and vice versa in moving the plastic positioner from one extreme position of its stroke to the other extreme position. The stroke of the plastic positioner carriage 156 is adjusted to carry the end of the plastic strip 115 to the right edge of the stationary mandrel 108 when the carriage is in the right hand position so that the plastic strip 115 extends over the entire width of the primary mandrel 105 and the blank folded around the mandrel. A vacuum pick-up pad 162 is mounted on the underside of the plastic positioner 104 which is positioned vertically above the end of the plastic strip 115. The plastic pick-up pad 162 is externally connected through line 163 to the vacuum pump 30 through the vacuum line I. Thus, when a vacuum is applied to pick-up pad 162, the end of the plastic strip 115 is picked up by the plastic positioner 104 and the plastic strip carried across the top of the stationary platen and primary mandrel 108 when the carriage is stroked by retracting the piston in the right plastic positioner cylinder 17a. The plastic positioner 104 is returned to the original position after the vacuum to the pickup pad 162 is cut off by retracting the piston in the left plastic positioner cylinder 17.

The plastic roll 110 is supported by a holder 164 which is mounted on the platen carriage assembly 112 at the left side of the machine. The plastic loop blade 111 is mounted on vertical guides 165 which are supported by the holder 164. The plastic loop blade 111 is connected to the piston rod which moves vertically with the piston in the plastic loop cylinder 19 mounted to the platen carriage assembly vertically beneath the blade 111. The piston of the plastic loop cylinder 19 is held in the retracted position, with the blade 111 in a normally up position, by means of a spring except when the piston is extended through pneumatic pressure.

Having described the configuration of the basic mechanisms comprising the major units of the machine, the controls by which the mechanism are actuated in automatically carrying out the sequential steps previously tabulated are discussed below.

CONTROL CIRCUIT SEQUENCING ACTION

The following descriptive material describes the manner and sequence in which the various electrical and pneumatic control elements, which control the actuation of the machine mechanisms described above, are energized to carry out the operational cycles of the machine described in the first portion of this specification.

In following the descriptive material, reference should be made to FIGURES 16–23. The operation of the control circuitry is described for the initial operation of turning the machine on to energizing the control circuitry and pressurize the pneumatic system, and for the various operational steps for each of the three cycles previously described. The electrical and pneumatic circuit diagram is contained in FIGS. 16 and 17. The first sequence is that required to turn on the machine and energize the control circuits to ready the machine for the first operation step as indicated by FIGS. 18 and 19.

The squencing description is listed under four major subsections: (A) Machine Energizing Sequence, (B) Cycle I Sequence, (C) Cycle II Sequence, and (D) Cycle III Sequence. A simplified schematic diagram for each of these four operations is shown in FIGS. 20–23, respectively. These diagrams indicate schematically the order and source for actuating each of the control units. Divisional lines are shown on the diagrams to indicate the operational steps generated by the actuation of the indicated control units. The numerical designation of the steps is that shown under the Operation Step description included at the initial portion of the specifications; e.g. III-4 refers to step 4 of Cycle III.

A. MACHINE ENERGIZING SEQUENCE (FIG. 20)

The operator closes safety switch 84 to supply 115 volt, 60 cycle current to the machine.

To energize the heater, the operator closes the heater switch 79 which energizes the magnet of relay 53 through the normally closed thermostat switch 87. Closing of relay 53 connects the heater 86 across the line.

To energize the control side of the circuit prior to starting Cycle I, the operator manually depresses the start button 75. This establishes a circuit for energizing relay 52 which originates at the common side of the line, passing through the magnet of relay 52. Closing relay 52 energizes the solenoid of valve 12 which shifts the spool of valve 12 against the spring pressure to permit high-pressure air from source 25 to enter the high-pressure line through valve 26. Pressure in the high-pressure line closes pressure switch 73 which energizes the magnet in relay 54. Closing relay 54 connects power to the control side of the circuit prior to starting Cycle I. Closing relay 52 also maintains the magnet of relay 52 energized by connecting the common side of the line through the closed relay 52 and the normally-closed stop button 76 to the control side of the line.

B. CYCLE I SEQUENCE (FIG. 21)

Operator momentarily depresses foot switch 74 in step 1 of Cycle I sending electrical impulse through previously locked relay 49, previously unlocked relay 45, and through closed pressure switch 55 to solenoid B of creaser blade valve 1 which in turn shifts the spool in valve 1 routing air pressure to M end of creaser blade cylinder 13 and connects L end of cylinder 13 to atmospheric exhaust line thereby causing pressure switch 55 to open.

NOTE.—All 4-way air valves except bonding iron valve 10 are springless type valves. There is no center position in these valves—the valve spools will remain in the position they were last shifted until the opposite solenoid is energized.

Piston of creaser blade cylinder 13 moves from M to L end of the cylinder and rotates the creaser blade into the down position through the linkage described above in step 2 of Cycle I (the speed of movement being controlled by control valve 28 on L end of cylinder). As piston reaches end of stroke this causes a rise in air pressure in M end of cylinder line due to reduced flow thereby causing pressure switch 56 to close.

The closing of pressure switch 56 energizes solenoid A of valve 1 which in turn shifts the spool in valve 1 routing air pressure to L end of creaser blade cylinder 13 and connects M end of cylinder 13 to atmospheric exhaust line thereby causing pressure switch 56 to open.

Piston of creaser blade cylinder 13 moves from L to M end of cylinder and raises the creaser blade 101 in step 3 of Cycle I (the speed of movement being controlled by control valve 28 on M end of cylinder). As piston reaches end of stroke this causes a rise in air pressure in L end of cylinder line due to reduced flow thereby causing pressure switch 55 to close.

As piston of creaser blade cylinder 13 was moving from M to L it mechanically trips limit switch 85. This limit switch is of a momentary contact type.

The tripping of limit switch 85 causes an electrical impulse to be sent over the following two routes simultaneously.

(a) Through previously unlocked relay 37 to the unlock magnet of relay 49. The unlocking of this relay sets up an interlock preventing further operation in the event the operator holds foot switch 74 depressed. Foot switch 74 must be released, thereby locking relay 49, before it can be of operational use again.

(b) Through electrically closed relay 50 to solenoid B of the short stroke valve 2 which in turn shifts the spool in valve 2 routing air pressure to T end of the short stroke cylinder 14 and connects S end of cylinder 14 to atmospheric exhaust line causing pressure switch 57 to open which breaks the holding current to relay 50.

Piston of short stroke cylinder 14 moves from T to S end of the cylinder moving the platen carriage assembly 112 to its forward position in a short stroke for step 4 of Cycle I. This forward motion of the platen carriage assembly also rotates the mandrels to the closing platen side in carrying out step 5 of Cycle I (the speed of movement being controlled by needle valve 27 in atmospheric exhaust line of valve 2). As piston reaches end of stroke this causes a rise in air-pressure in T end of cylinder line due to reduced flow thereby causing pressure switch 58 to close.

This completes the operation of sequence of Cycle I.

C. CYCLE II SEQUENCE (FIG. 22)

Operator momentarily depresses foot switch 74 in step 1 of Cycle II sending electrical impulse through previously locked relay 49, previously unlocked relay 45, and through closed pressure switch 55 to solenoid B of creaser blade valve 1 which in turn shifts the spool in valve 1 routing air pressure to M end of creaser blade cylinder 13 and connects L end of cylinder 13 to atmospheric exhaust line thereby causing pressure switch 55 to open.

Piston of creaser blade cylinder 13 moves from M to L end of the cylinder and again actuates the linkage which lowers the creaser blade 101 to the down position for step 2 of Cycle II (the speed of movement being controlled by valve 28 on L end of cylinder). As piston reaches end of stroke this causes a rise in air pressure in M end of cylinder line due to reduced flow thereby causing pressure switch 56 to close.

The closing of pressure switch 56 energizes solenoid A of creaser blade valve 1 which in turn shifts the spool in valve 1 routing air pressure to L end of creaser blade cylinder 13 and connects M end of cylinder 13 to atmospheric exhaust line thereby causing pressure switch 56 to open.

Piston of cylinder 13 moves from L to M end of cylinder and raises the creaser blade 101 for step 3 of Cycle II (the speed of movement being controlled by control valve 28 on M end of cylinder). As piston reaches end of stroke this causes a rise in air pressure in L end of cylinder line due to reduced flow thereby causing pressure switch 55 to close.

As piston or creaser blade cylinder 13 was moving from L to M, it mechaically trips limit switch 85. This limit switch is of a momentary contact type.

The tripping of limit switch 85 causes an electrical impulse to be sent over the following two routes simultaneously.

(a) Through previously unlocked relay 37 to the unlock magnet of relay 49. The unlocking of this relay sets up an electrical interlock preventing further operation in the event the operator holds foot switch 74 depressed. Foot switch 74 must be released, thereby locking relay 49, before it can be of operational use again.

(b) Through previously closed pressure switch 58 to the lock magnet of relay 38, the lock magnet of relay 39, and to solenoid A of short stroke valve 2 which in turn shifts the spool in valve 2 routing air pressure to S end of short stroke cylinder 14 and connects T end of cylinder 14 to atmospheric exhaust line thereby causing pressure switch 58 to open.

Piston of short stroke cylinder 14 moves from S to T end of the cylinder and moves the platen carriage assembly 112 rearward to its original position and rotates the primary mandrel 108 over to the stationary platen side by the linkages described above to carry out step 4 of Cycle II (the speed of movement being controlled by needle valve 27 in atmospheric exhaust line of valve 2). As piston reaches end of stroke this causes a rise in air pressure in S end of cylinder line due to reduced flow thereby causing pressure switch 57 to close.

The closing of pressure switch 57 energizes the magnet of relay 50. The closing of relay 50 causes an electrical impulse to be sent over the following two routes simultaneously:

(a) Through previously locked relay 38 to B solenoid of corner creaser valve 3 which in turn shifts the spool in of corner creaser valve 3 routing air pressure to B end of the large corner creaser cylinder 15 and A end of the two small corner creaser cylinders 16 and connects C end of cylinder 15 to atmospheric exhaust line thereby causing pressure switch 59 to open. Pistons of corner creaser cylinders 15 and 16 move to the end of their respective strokes thereby diagonally moving the four corner creasers 107 diagonally inwardly through the described linkage to carry out step 5 of Cycle II.

(b) Through previously locked relay 39 to solenoid B of plastic positioner valve 4 and solenoid B of vacuum valve 5. The energizing of solenoid B of vacuum valve 5 in turn shifts the spool of valve 5 connecting plastic pick-up line I and the plastic pickup pad 162 to vacuum pump 30 whereby the plastic strip is picked up by the plastic positioner 104 and laid over the mandrel in carrying out the first action of step 6 of Cycle II. The energizing of solenoid B of plastic positioner valve 4 in turn shifts the spool of valve 4 routing air pressure to O end of the right plastic positioner cylinder 17a and connects N end of the left plastic positioner cylinder 17 to atmospheric exhaust line thereby causing pressure switch 60 to open.

Pistons of plastic positioner cylinder 17 and 17a move from O to N ends of the cylinders to stroke the plastic positioner 104 over the stationary platen to complete step 6 of Cycle II (the speed of movement being controlled by control valve 28 on N end of cylinder). As pistons reach end of stroke this causes a rise in air pressure in O end of cylinder line due to reduced flow thereby causing pressure switch 61 to close.

The closing of pressure switch 61 causes an electrical impulse to be sent to the lock magnet of relay 40 and to the unlock magnet of relay 39, which upon unlocking sends an electrical impulse to solenoid A of plastic positioner valve 4 and solenoid A of vacuum valve 5. The energizing of solenoid A of vacuum valve 5 in turn shifts the spool of valve 5 connecting plastic pick-up line I to valve 4 atmospheric exhaust line through needle valve 27 to release the plastic strip from the pickup pad 162. This shifting of the spool of valve vacuum 5 also connects suction line of vacuum pump 30 to filter 30a through check valve 29. The energizing of solenoid A of plastic positioner valve 4 in turn shifts the spool in valve 4 routing air pressure to N end of left plastic positioner cylinder 17 and connects O end of right plastic positioner cylinder 17a to atmospheric exhaust line through needle valve 27, thereby causing pressure switch 61 to open.

Pistons of cylinder 17 and 17a move from N to O end of cylinders and return the plastic positioner 104 to its original position for step 7 of Cycle II (the speed of movement being controlled by needle valve 27 in plastic positioner valve 4 exhaust line). As plastic positioner pistons reach end of stroke this causes a rise in air pressure in N end of plastic positioner cylinder line due to reduced flow thereby causing pressure switch 60 to close.

The closing of pressure switch 60 causes an electrical impulse to be sent through previously locked relay 40 to solenoid B of platen valve 6 which in turn shifts the spool in platen closing valve 6 routing air pressure to H end of plastic loop cylinder 19 and to E end of platen closing cylinder 18 and connects D end of platen closing cylinder 18 to atmospheric exhaust line thereby causing pressure switch 62 to open.

Piston of platen closing cylinder 18 moves from E to D end of cylinder and rotates the closing platen 106 over the top of the stationary platen 105 by the above described linkage in carrying out step 8 of Cycle II. Piston of plastic loop cylinder 19 moves to end of stroke and lowers the plastic loop blade 111 for step 9 of Cycle II.

As piston of plastic loop cylinder 19 reaches the last increment of stroke it mechanically trips limit switch 91. This limit switch is of a spring loaded type whereby it will open as piston of plastic loop cylinder 19 reverses and moves back toward H end of cylinder.

The closing of limit switch 91 causes an electrical impulse to be routed to the lock magnet of relay 45, the lock magnet of relay 46, the lock magnet of relay 37, and through previously closed relay 50 to the unlock magnet of relay 38.

The locking of relays 45 and 46 preset the control circuit for Cycle III to follow.

The locking of relay 37 sets up an electrical interlock preventing further operation in the event the operator holds foot switch 74 depressed. This interlock circuit also embraces the use of pressure switch 62 which must be closed before foot switch 74 is electrically operative.

The unlocking of relay 38 causes an electrical impulse to be routed to solenoid A of corner creaser valve 3 which in turn shifts the spool of valve 3 routing air pressure to C end of the large corner creaser of cylinder 15 and connects B end of the large corner creaser cylinder 15 and A end of the two small corner creaser cylinders 16 to atmospheric exhaust line.

Through spring action the two pistons of the small corner creaser cylinders 16 return to the A ends of the cylinders while the piston of large corner creaser cylinder 15 is hydraulically moved from C to B end of cylinder 15 thereby withdrawing the corner creasers 107 diagonally outwardly in step 10 of Cycle II. As piston of the large corner creaser cylinder 15 reaches end of stroke this causes a rise in air pressure in C end of cylinder line due to reduced flow thereby causing pressure switch 59 to close.

The closing of pressure switch 59 causes an electrical impulse to be routed to the unlock magnet of relay 40 which, upon unlocking, sends energizing current to solenoid A of platen closing valve 6 which in turn shifts the spool in valve 6 routing air pressure to D end of platen closing cylinder 18 and connects E end of cylinder 18 and H end of plastic loop cylinder 19 to atmospheric exhaust line.

Piston of platen closing cylinder 18 moves from D to E end of cylinder, thereby rotating the closing platen 106 back to its original position through the previously described linkage to carry out step 11 of Cycle II. At the same time, piston of cylinder 19 is forced by spring action back to H end of plastic loop cylinder to raise the plastic loop blade 111 to its top position for step 12 of Cycle II (the speed of movement being controlled by valve 28 in E end of cylinder line). As piston of cylinder 18 reaches end of stroke this causes a rise in air pressure due to reduced flow thereby causing pressure switch 62 to close. The closing of this pressure switch completes the power circuit of foot switch 74 whereby the foot switch becomes operational.

This completes the operation of Cycle II.

D. CYCLE III SEQUENCE (FIG. 23)

Operator momentarily depresses foot switch 74 sending electrical impulse through previously locked relays 49, 45, and 46, to the lock magnet of relay 47, which upon locking, energizes the unlock magnets of relays 37 and 46 and also energizes solenoid B of valve bonding iron 10. The unlocking of relays 37 and 46 preset the control circuit for Cycle I to follow the completion of Cycle III.

The energizing of solenoid B of bonding iron valve 10 in turn shifts the spool in valve 10 routing air pressure to K end of bonding iron cylinder 20 and connects J end of cylinder 20 to atmospheric exhaust line.

Piston of bonding iron cylinder 20 moves from K to J end of cylinder and closes the jaws of the bonding iron 103 to light pressure through the previously described linkage for step 1 of Cycle III. As piston reaches end of stroke this causes a rise in air pressure in K end of cylinder line due to reduced flow thereby causing pressure switch 65 to close. The closing of pressure switch 65 sends an electrical impulse over the following two routes simultaneously.

(a) To the unlock magnet of relay 47 which upon unlocking breaks the current to solenoid B of bonding iron valve 10. Since this is a spring centered valve the valve spool moves to center thereby connecting both ends of bonding iron cylinder 20 to atmospheric exhaust line.

(b) Through de-energized relay 51 and through previously unlocked relay 41 to the lock magnet relay 42. The locking or relay 42 in turn energizes solenoid B of mandrel valve 7 which in turn shifts the spool in valve 7 routing air pressure to G end of mandrel cylinder 22 and connects F end of cylinder 22 to atmospheric exhaust line thereby causing pressure switch 68 to open.

Piston of mandrel cylinder 22 moves from G to F end of cylinder and lifts the mandrels to their raised position through the previously described parallelogram linkage system for step 2 of Cycle III (the speed of movement being controlled by control valve 28 on G end of cylinder). As piston reaches end of stroke this causes a rise in air pressure in G end of cylinder line due to reduced flow thereby causing pressure switch 67 to close.

The closing of pressure switch 67 energizes the unlock magnet of relay 42 and the lock magnets of relays 48 and 43.

The locking of relay 43 causes B solenoid of long stroke valve 8 to be energized which in turn shifts the spool in valve 8 routing air pressure to R end of long stroke cylinder 23 and connects Q end of cylinder 23 to atmospheric exhaust line thereby causing pressure switch 70 to open.

Piston of long stroke cylinder 23 moves from R to Q end of cylinder and shifts the intermediate carriage with the platen carriage assembly 112 to insert the mandrels into the jaws of the bonding iron 103 for step 3 of Cycle III (the speed of movement being controlled by needle valve 27 in atmospheric exhaust line of long stroke valve 8). When the piston reaches the end of stroke, it causes a rise in air pressure in R end of cylinder line due to reduced flow thereby causing pressure switch 69 to close.

The closing of pressure switch 69 energizes the lock magnet of relay 44 which, upon locking, energizes B solenoid of piercing needle valve 9 which in turn shifts the spool in valve 9 routing air pressure to V end of needle cylinders 24 and connects U end of cylinders 24 to atmospheric exhaust line, thereby causing pressure switch 72 to open.

Pistons of needle cylinders 24 move from V to U end of the cylinders and insert the needles 102 into the bonding iron for step 4 of Cycle III. When the piston reaches the end of stroke, this causes a rise in air pressure in V end of cylinder line due to reduced flow, thereby causing pressure switch 71 to close.

The closing of pressure switch 71 energizes the unlock magnet of relay 43 and also energizes solenoid A of long stroke valve 8 through previously locked relay 43 and at the same time energizes solenoid A of mandrel valve 7 through the previously unlocked relay 42.

The energizing of solenoid A of long stroke valve 8 shifts the spool in valve 8 routing air pressure to Q end of long stroke cylinder 23 and connects R end of cylinder 23 to atmospheric exhaust line thereby causing pressure switch 69 to open.

Piston of long stroke cylinder 23 moves from Q to R end of cylinder and returns the intermediate carriage 132 with the platen closing carriage 112 to its original forward position to withdraw the mandrels from the bonding iron 101 in carrying out step 5 of Cycle III (the speed of movement being controlled by needle valve 27 in atmospheric exhaust line of valve). As piston reaches end of stroke this causes a rise in air pressure in Q end of cylinder line thereby causing pressure switch 70 to close.

The energizing of solenoid A of mandrel valve 7 (which occurs simultaneously with the energization of long stroke valve 8) in turn shifts the spool in valve 7 routing air pressure to F end of mandrel cylinder 22 and connects G end of cylinder 22 to atmospheric exhaust line thereby causing pressure switch 67 to open.

Piston of cylinder 22 moves from F to G end of cylinder to lower the mandrels to their original position on top of the platens through the action of the previously described parallelogram linkage to carry out step 6 of Cycle III (the speed of movement being controlled by control valve 28 on F end of cylinder). As piston reaches end of stroke this causes a rise in air pressure in F end of cylinder line due to reduced flow thereby causing pressure switch 68 to close.

The closing of pressure switch 70 causes the unlock magnet of relay 44 to be energized which in turn causes solenoid A of piercing needle valve 9 to be energized which in turn shifts the spool in valve 9 routing air pressure to U end of needle cylinders 24 and connects V end of cylinders 24 to atmospheric exhaust line thereby causing pressure switch 71 to open.

Pistons of needle cylinders 24 move from U to V end of cylinders to withdraw the needle 102 from the bonding irons 103 for step 7 of Cycle III. When the pistons reach the end of stroke, this causes a rise in air pressure in U end of cylinder line due to reduced flow thereby causing pressure switch 72 to close.

The closing of pressure switch 72 sends an electrical impulse through previously closed pressure switch 68 and through previously locked relay 48 to the solenoid of valve 11 which in turn shifts the spool of timer valve 11 routing air pressure to W end of timer cylinder 21.

Piston of cylinder 21 moves from W end to end of stroke to actuate the timer 89 and initiate step 8 of Cycle III. When the piston reaches the end of stroke, this causes a rise in air pressure in W end of cylinder line due to reduced flow thereby causing pressure switch 66 to close which upon closing energizes the unlock magnets of relays 45 and 48. The unlocking of relay 45 completes the control circuit for Cycle I which may be started at this time assuming foot switch 74 has been released thereby locking relay 49.

The unlocking of relay 48 breaks the solenoid energizing circuit of timer valve 11 whereby the spool of valve 11, which is spring loaded, is shifted—connecting W end of cylinder 21 to atmospheric exhaust line thereby causing piston of timer cylinder 21 to move to W end of cylinder.

As piston of timer cylinder 21 was traveling away from W end (with valve 11 solenoid energized) and as it reached the last increment of stroke it mechanically trips timer 89 which, upon closing, energizes the magnet of relay 51. This in turn causes an electrical impulse to be routed to solenoid B of bonding iron valve 10 which, in turn shifts the spool of valve 10 routing air pressure to K end of bonding iron cylinder 20 and connects J end of cylinder 20 to atmospheric exhaust line. The piston of this cylinder had been moved to J end of stroke previously so this last operation tightly clamps the jaws of the bonding iron 103 through the previously described linkage system to establish step 9 of Cycle III.

As the air pressure rises in K end of bonding iron cylinder 20, due to reduced flow, pressure switch 65 closes which in turn energizes the lock magnet of relay 41 through previously energized relay 51.

From this point the operation of the circuit remains static until such time that the timer contacts open which deenergizes the magnet of relay 51 for step 10 of Cycle III.

As relay 51 is de-energized this causes an electrical impulse to be sent to solenoid A of bonding iron valve 10 which in turn shifts the spool in bonding iron valve 10 routing air pressure to J end of bonding iron cylinder 20 and connects K end of cylinder 20 to atmospheric exhaust line.

Piston of bonding iron cylinder 20 moves from J to K end of cylinder and opens the jaws of the bonding iron 103 through the previously described linkage for step 11 of Cycle III. When the piston reaches the end of stroke this causes a rise in air pressure in J end of cylinder line due to reduced flow which causes pressure switch 64 to close.

The closing of pressure switch 64 energizes the unlock magnet of relay 41 which in turn breaks the energizing circuit of solenoid A of bonding iron valve 10, thereby permitting the valve springs to center the spool which connects both J and K end of bonding iron cylinder 20 to atmospheric exhaust line.

This completes the operation sequence of Cycle III and the machine is ready to start Cycle I upon depressing the foot switch 74.

Obviously many modifications and variations in the above described embodiment of the invention are possible in light of the above teachings. It is therefore to be understood that, within the scope of the appended claims, the invention may be practical otherwise than as specifically described.

What is claimed is:

1. A method of forming a plurality of fabric blanks into a multi-ply, hemmed fabric unit for a garment, such as a cuff, comprising the steps of folding a hem along the edges of at least the blanks comprising the outer plies, arranging the blanks of all said plies in an overlying, registered relationship to form a stack in which said hems on the outer blanks of said stack face inwardly with the facing surfaces of the blanks in said stack having a non-activated bonding material between them, and applying energy to said stack activating the bonding material and causing it to adhere to said blanks and bond them together into an integral unit.

2. A method as described in claim 1 wherein said bonding material is a thermally softening material and said energy application includes applying heat.

3. A method of forming a plurality of fabric blanks into a multi-ply, hemmed fabric unit for a garment, such as a cuff, comprising the steps of folding a hem along the edges of at least the blanks comprising the outer plies, arranging the blanks of all said plies in an overlying, registered relationship to form a stack in which said hems on the outer blanks of said stack face inwardly, positioning non-activated bonding material between each blank of said stack when arranging the blanks into said stack, and applying energy to said stack activating the bonding material and causing it to adhere to said blanks and bond them together into an integral unit.

4. A method as described in claim 3 wherein said bonding material is a thermo-plastic material and said energy application comprises heat and pressure externally applied to the outer blanks of said stack.

5. A method of fabricating a two-ply, hemmed fabric unit, such as a cuff, from two fabric blanks having border areas from which said hems are formed comprising the steps of folding a straight hem along at least one corresponding edge of each of the said two blanks, folding hems along the remaining unfolded edges of each said blank of a width to contour the outline of the folded blanks to that of said hemmed unit, arranging said folded blanks together in an overlying, registering relationship with the hems facing inwardly and the facing surfaces of the folded blanks have a non-activated bonding material between them, and applying to said overlying blanks energy activating said bonding material to cause it to adhere to said overlying blanks and bond them together into an integral unit.

6. A method of fabricating a two-ply, hemmed fabric article, such as a cuff, from two fabric blanks having border areas from which said hems are formed, comprising the steps of folding back corresponding border areas of each of the said two blanks along at least one edge of each said blank to form initial hems, positioning a flat mandrel having more than one edge contoured to conform to the outline of said hemmed fabric article atop each said blank with folded hems such that the remaining unfolded border areas of each said blank protrude beyond said contoured edges of the overlying mandrel, folding said protruding border areas of each blank around the contoured edges and onto the top surface of the overlying mandrel to form the remaining hems, positioning a layer of non-activated bonding material to overlie the top surface and hems folded thereover of one of said mandrels, positioning said mandrels together in a registered, overlying relationship with the top surfaces and the remaining hems thereon facing together with said bonding material therebetween, moving said overlying mandrels relative to said blanks folded therearound in a direction toward mandrel edges other than said contoured edges to withdraw said overlying mandrels from within said folded blanks folded therearound, and applying to said folded, overlying blanks energy activating said bonding material between the facing surfaces of said overlying blanks to cause said bonding material to adhere to said overlying blanks and bond them together into an integral fabric article.

7. A method of fabricating a two-ply, hemmed fabric unit, such as a cuff, from two fabric blanks comprising the steps of creasing each of the two said blanks along a line spaced inwardly of a corresponding edge to produce an upwardly extending flap, folding each said flap back onto the blank along the crease to form a first hem by positioning a flat mandrel on top of each said creased blank and flap, each of said mandrels shaped and positioned such that a marginal portion of each said blank extends beyond the edges of each positioned mandrel except along said creased edge of each blank, folding said marginal portions of each blank around the edges and over the upper surface of the respective overlying mandrels to form the remaining hems, positioning non-activated bonding material on the upper surface of one of said mandrels and said remaining hems thereon, positioning said mandrels to overlie one another with the edges in registry and the upper surfaces and remaining hems thereon facing, withdrawing said overlying mandrels from within the overlying blanks folded therearound to place the two blanks with folded hems in an assembled relationship with said bonding material between them, and applying to said assembled blanks energy activating said bonding material and causing it to adhere to said assembled blanks and bond them together into an integral unit.

8. A method of folding and positioning two fabric blanks having border areas from which hems are formed into a final assembled relationship in fabricating a two-ply hemmed fabric article, such as a cuff, comprising the steps of folding back onto the top surface of each of the two said blanks corresponding border areas of each said blank along at least one side to form initial hems, positioning a flat mandrel having more than one edge contoured to conform to the outline of said hemmed fabric unit atop each said blank with folded hem such that the remaining unfolded border areas of each said blank protrude beyond said contoured edges of the overlying mandrel, folding said protruding border areas of each blank around the contoured edges and onto the top surface of the overlying mandrel to form the remaining hems, positioning said mandrels to overlie one another with the edges in registry and the top surfaces with remaining hems thereon facing, withdrawing said overlying mandrels from within said blanks folded therearound in a direction toward a mandrel edge other than said contoured edges, thereby arranging two blanks with folded hems into the final assembled relationship of the finished fabric article.

9. An apparatus for fabricating a two-ply hemmed fabric article, such as a cuff, from two fabric blanks having border areas from which said hems are formed, comprising two identical flat mandrels each having the edges of more than one side contoured to the outline of said hemmed article; a set of creaser segments movable relative to each of the two said mandrels and having edges facing and conforming to the contoured edges of each of said mandrels; means for moving each set of said creaser segments between a retracted position in which the facing edges of said segments and mandrels are separated and a position in which said facing edges are together, whereby a fabric blank, which overlies one surface of each said mandrel and has the border area along at least one edge folded back against said one mandrel surface to form an initial hem with the remaining border areas extending beyond said contoured edges of the contacting mandrel, is folded around said mandrel by moving said segments from their retracted position towards said mandrel edges to fold said protruding border areas around said contoured mandrel edges to overlie the other of said mandrel surfaces and form the remaining hems thereon; means for positioning said mandrels with folded blanks into an overlying, registered relationship such that said other mandrel surfaces and remaining hems thereon face each other; retaining means exterior to said overlying mandrels for attaching to the fabric of said blanks folded around said overlyingly positioned mandrels; means for moving said overlying mandrels relative to said retaining means in the direction of an edge of said mandrel other than said contoured edges, thereby removing said mandrels from within said folded, overlying blanks; and means for transmitting to said overlying blanks energy which activates adhesive on the inner surfaces of said overlying blanks to bond them together into an integral hemmed article.

10. An apparatus for fabricating a two-ply hemmed fabric unit, such as a cuff, from two fabric blanks having border areas from which said hems are formed, comprising two flat mandrels each having at least one edge contoured to the outline of said hemmed article, means for positioning each of the two said mandrels in a separate location with one surface of each said mandrel in contact with a different fabric blank of which the border area along at least one edge has been folded back on the side contacting the mandrel to form an initial hem and the remaining unfolded border areas protrude beyond said contoured edges of the contacting mandrel, folding means at each said separate location cooperating with each said mandrel thereat for folding said protruding border areas of the blank over the contoured edges of said contacting mandrel to overlie the other of the mandrel surfaces and form the remaining hems, means for transferring said mandrels between their position at said separate locations and a position overlying one another with the edges in registry within a bonding medium to have the other of said mandrel surfaces and said remaining hems thereon facing together, said bonding medium having retaining means for attaching to the fabric of both said blanks folded around said overlyingly positioned mandrels, whereby said folded fabric blanks may be retained within said bonding medium when said mandrel transferring means removes said mandrels from the bonding medium, and means for supplying energy to said bonding medium, said bonding medium arranged to transmit to said retained blanks said energy which activates adhesive on the inner facing surfaces of said retained blanks to bond them together into an integral hemmed article.

11. The apparatus as described in claim 10 wherein each said folding means includes creaser segments movable relative to said separate location between a position spaced away from the contoured edges of the mandrel at said separate location and to a position adjacent those contoured edges, and means for moving said segments between the aforesaid two positions, whereby said segments engage said protruding border areas of the blanks and fold them around the contoured edges of the mandrels onto the other said mandrel surface.

12. The apparatus as described in claim 11 additionally comprising means mounted adjacent one of said separate locations for positioning an adhesive material onto said other surface of the mandrel positioned at said one location to overlie said remaining hems on said mandrel, thereby providing said adhesive over the inner facing surface of a folded blank.

13. The apparatus as described in claim 12 wherein said folding means are associated with said mandrel transferring means in a manner to be positioned in an overlying, registered relationship along with the mandrels, and those portions of said segments positionable adjacent said mandrel contoured edges have mating cutting edges, whereby any portion of said adhesive strip positioned on said one mandrel and extending beyond the contoured edges thereof is cut off when said folding means and mandrels are overlyingly positioned.

14. The apparatus as described in claim 13 wherein said energy comprises heat and pressure and said bonding medium is arranged to apply said heat and pressure to the outer surfaces of said retained blanks, thereby activating said adhesive strip of thermo-plastic material and causing it to adhere to said folded blanks and bond them together.

15. An apparatus for fabricating a two-ply hemmed fabric article, such as a cuff, from two fabric blanks having border areas from which hems are formed, comprising a bed having two separate flat areas on each of which a fabric blank is positionable; two flat mandrels each having its edges except in one sector contoured to the outline of said hemmed article; means for positioning each of the two said mandrels on a different one of said bed areas to overlie a fabric blank of which the border area along one edge has been folded back atop the blank to form a first hem and the remaining border areas protrude beyond said contoured edges of the overlying mandrel; folding means at each said bed area each having a set of creaser segments movable over the surface of said bed between a position spaced oppositely from the contoured edges of the mandrel on said bed area and a position adjacent said contoured edges and having means for moving said segments between aforesaid positions, thereby engaging said protruding border areas of each blank and folding them around the contoured mandrel edges to extend over the top surface of said mandrel and form the remaining hems; means for transferring the two said mandrels and their associated folding means between their separate positions on each bed area and a position overlying one another in a registered relationship with the top mandrel surfaces and remaining hems thereon facing; a bonding medium having means for attaching to the fabric of said blanks folded around said overlyingly positioned mandrels; means for positioning said overlying mandrels within said bonding medium and withdrawing said mandrels therefrom in the direction of said non-contoured sector of the mandrels to separate said mandrels from the folded, overlying blanks attached to and retained by said bonding medium; and means for supplying energy to said bonding medium, said bonding medium arranged to transmit to said retained blanks said energy which activates adhesive on the inner facing surfaces of said overlying blanks to bond them together into an integral hemmed article.

16. An apparatus for fabricating a two-ply hemmed fabric article, such as a cuff, from two fabric blanks having border areas from which hems are formed, comprising a bed with two separate flat areas on each of which a fabric blank is positionable; two flat mandrels each having the edges except in one sector contoured to the outline of said hemmed article; means for positioning each of the two said mandrels on a different one of said bed areas to rest on a fabric blank of which the border area along one edge has been folded back atop the blank to form a first hem and the remaining border areas protrude beyond said contoured areas of the overlying mandrel; means movably mounted on said bed at each said bed area and cooperating with a mandrel thereon for folding said protruding border areas of the blank over the contoured mandrel edges to overlie the top surface of said mandrel and form the remaining hems; means for transferring one of said mandrels with folded blanks and its cooperating folding means between their position atop one of said bed areas and a position overlying the other of said mandrels and folding means on the other bed area to place the mandrel edges in registry and the top mandrel surfaces and remaining hems thereon facing each other; a bonding iron having two opposing bonding surfaces and means for parting and closing said surfaces; means for transferring said overlyingly positioned mandrels with folded blanks between said other bed area and a position between said bonding surfaces; fabric attaching means on said bonding iron for attaching to the fabric of said blanks folded around said overlying mandrels when positioned within said bonding surfaces to retain said folded blanks arranged in an assembled relationship within said bonding surfaces when said overlying mandrels are retransferred to said bed; and means for supplying energy to said bonding surfaces for transmittal to said retained folded blanks to activate an adhesive on the inner facing surfaces of said retained blanks and bond them together into an integral hemmed article.

17. An apparatus for fabricating a two-ply hemmed fabric article, such as a cuff, from two fabric blanks having border areas from which hems are formed, comprising a bed with two separate flat areas, on each of which a different fabric blank is positionable; means cooperating with each said bed area for creasing each blank resting thereon along a line inwardly of corresponding edges to produce a flap extending upwardly from said crease; two flat mandrels each having the edges, except in one sector, contoured to the outline of said hemmed article; means for positioning each of the two said mandrels on a different one of said bed areas to overlie a creased blank thereon and fold back said flap beneath the mandrel to form a first hem, the unfolded border areas of said blanks protruding beyond said contoured edges of each overlying mandrel; means movably mounted on said bed at each said bed area cooperating with a mandrel thereon for folding said protruding border areas of the blank over the contoured mandrel edges to overlie the top surface of said mandrel and form the remaining hems; means for transferring said mandrels and associated folding means between their separate positions on each separate bed areas and a position overlying one another with the top surfaces of the mandrels and said remaining hems thereon facing each other; a bonding medium having means for attaching to the fabric of said blanks folded around said overlyingly positioned mandrels; means for positioning said overlying mandrels within said bonding medium and withdrawing said mandrels thereform in the direction of said non-contoured mandrel sector to separate said mandrels from the folded, overlying blanks attached to and retained within said bonding medium; and means for supplying energy to said bonding medium arranged to transmit to said retained blanks said energy which activates adhesive on the inner facing surfaces of said overlying blanks to bond them together into an integral, hemmed article.

18. The apparatus as described in claim 17 wherein said means for creasing each blank includes a vertically movable creaser blade mounted above said bed and means moving said blade between a position above said bed and a position to place the edge of said blade in contact against each said separate bed area to crease each blank resting on the bed along a line inwardly of corresponding edges.

19. The apparatus as described in claim 18 wherein said means for moving said blade edge into contact with each bed area includes means horizontally shifting said bed to place each bed area selectively directly beneath said creaser blade.

20. An apparatus for fabricating a two-ply hemmed fabric article, such as a cuff, from two fabric blanks having border areas from which hems are formed, comprising a bed with two separate flat areas, on each of which a different fabric blank is positionable; means for contacting each said bed area from above along a line to crease each blank resting thereon along a line inwardly of corresponding edges and produce a flap extending upwardly from said crease; two flat mandrels each having the edges along all but one sector contoured to the outline of said hemmed articles; means for positioning each of the two said mandrels on a different one of said bed areas to overlie a creased blank thereon and fold back said flap beneath the mandrel to form an initial hem lying beneath the non-contoured mandrel sector, the remaining unfolded border areas of said blanks protruding beyond said contoured edges of the overlying mandrel; a set of corner creasers movably mounted on said bed adjacent each said separate area, each said set having segments with edges shaped to form convex edge lines complementary in shape to the contoured edges of a mandrel and each said set positioned relative to the mandrel on each said bed area so that said complementary shaped edges are facing; means for moving each said set of corner creasers over said bed between a position on said bed area outside the protruding border area of said blank positioned thereon and a position against the facing mandrel edges, thereby folding said protruding border areas of the blank over the contoured edges of the overlying mandrel and onto the top surface thereof to form the remaining hems; means located above one of said bed areas for positioning an adhesive material onto the top surface of the mandrel resting on that bed area; means for transferring the mandrel with folded blank and its set of corner creasers at the other of said bed areas between their position atop said other bed area and a position overlying the mandrel and its set of corner creasers on the one said bed area to place the mandrels in a registered relationship with the top surfaces and the remaining hems thereon facing each other; the top surfaces of said segments comprising each said set of corner creasers being contoured along said convex edge line to cooperate with each other and form a meshing, cutting edge when the sets of corner creasers are placed in an overlying relationship, whereby protruding edges of said adhesive positioned over said one mandrel are trimmed to the outline of said one mandrel; a bonding iron having two opposing bonding surfaces and means for parting and closing said surfaces; means for transferring said overlyingly positioned mandrels with folded blanks between said one bed area and a position between said bonding surfaces; attaching means on said bonding iron for attaching to the fabric of said blanks folded around said overlying mandrels when positioned within said bonding surfaces to retain said folded blanks arranged in an assembled relationship when said overlying mandrels are transferred from the bonding iron to said bed; and means for applying heat and pressure to said bonding surfaces for transmittal to said retained blanks therein, thereby causing said adhesive within the inner facing surfaces of said folded blanks to adhere to said blanks and bond them together into an integral, hemmed article.

21. The apparatus as described in claim 20 additionally comprising sequencing devices for initiating the operation of aforesaid means in proper sequence whereby the fabrication of said hemmed article is accomplished substantially automatically.

22. Apparatus for folding the hems of a hemmed fabric unit formed from a fabric blank having border areas from which said hems are formed, comprising a bed having a flat area, a mandrel having at least one edge contoured to the outline of said fabric article, means for positioning said mandrel onto said bed area to overlie a fabric blank of which the border area along at least one edge has been folded back atop the blank to form a first hem and the remaining border areas protrude beyond said contoured edges of the overlying mandrel, a set of corner creases movably mounted on said bed adjacent said area comprising segments having edges facing and conforming to the contoured edges of said mandrel on said bed area, means for moving said segments between a retracted position in which the facing edges of said segments and said mandrel are separated and a closed position in which said facing edges are together, thereby folding said protruding border areas of the blank over the contoured edges of the overlying mandrel and onto the top surface thereof to form the remaining hems, and means for pressing a holding surface downwardly in contact with the portion of the folded fabric which overlies said mandrel top surface and positively engages the material of said fabric blank while the mandrel is moved relative to said holding surface means in a direction other than toward a contoured edge.

23. Apparatus for folding hems around the edges of a fabric unit formed from a fabric blank having border areas from which said hems are formed, comprising a bed with a flat area having a perimeter defining the outline of a blank, means for pressing downwardly onto said bed area along a straight line inwardly of one edge to form a crease along one side of a blank resting on said bed area and produce an upwardly extending flap, a mandrel having edges except in one sector contoured to the outline of said fabric unit, means for positioning said mandrel onto said bed area atop a creased blank to have the contoured edges of said mandrel lying on one side of said creasing line, whereby said flap is folded back onto the blank beneath the mandrel to form a first hem and the unfolded border areas of the blank protrude beyond said contoured mandrel edges, a set of corner creasers movably mounted on said bed adjacent said area and comprising segments having edges which face said contoured edges of the mandrel on said bed and which combine to form an edge line complementary in shape to said contoured mandrel edges, means for moving said segments between a position on said bed outside the perimeter of said bed area and a position against the facing edges of said mandrel positioned on said bed area, thereby folding said protruding border areas of the blank over the contoured edges of the overlying mandrel and onto the top surface thereof to form the remaining hems, and means for positively engaging the folded fabric and moving said mandrel relative to the folded fabric blank in the direction of said one sector.

24. Apparatus as described in claim 23, wherein said means for creasing said blank includes a vertically movable creaser blade mounted over said bed area and means for moving said blade between a position above said bed and a position against said bed to place an edge of said blade into contact with the blank resting thereon to crease said blank along a line.

25. In an apparatus for fabricating a two-ply hemmed fabric article from two fabric blanks having border areas from which said hems are formed, the combination for folding hems in said blanks forming said plies, comprising two similar flat mandrels each having more than one edge contoured to the outline of said hemmed article; a set of creaser segments movable relative to each of the two said mandrels and having edges facing and conforming to the contoured edges of each said mandrel; means for moving each said set of creaser segments between a retracted position in which the facing edges of said segments and mandrels are separated and a position in which said facing edges are together, whereby a fabric blank, which overlies one surface of each said mandrel with the border area along at least one edge folded back against said mandrel surface to form an initial hem with the remaining border areas extending beyond said contoured edges of the contacting mandrel, is folded around said mandrel by said segments moving from their retracted position towards said mandrel edges and folding said protruding border areas around said contoured mandrel edges to overlie the other of said mandrel surfaces and form the remaining hems thereon; means for positioning said mandrels with folded blanks into an overlying, registered relationship such that said other mandrel surfaces and remaining hems thereon face each other; retaining means exterior to said overlying mandrels for attaching to the fabric of said blanks folded around said overlyingly positioned mandrels; and means for moving said overlying mandrels relative to said retaining means in the direction of an edge of said mandrel other than said contoured edges, thereby removing said mandrels from within said overlying blanks having folded hems around the sides.

26. In an apparatus for fabricating a two-ply hemmed fabric article from two fabric blanks having border areas from which said hems are formed, the combination for folding hems in the blanks forming said plies comprising a bed having two separate flat areas on each of which a different fabric blank is positionable; two similar flat mandrels each having more than one but not all edges contoured to the outline of said hemmed article; means for positioning each of the two said mandrels on a different one of said bed areas to rest on a fabric blank of which the border area along at least one edge has been folded back atop the blank to form a first hem and the remaining border areas protrude beyond said contoured edges of the overlying mandrel; folding means movably mounted on said bed adjacent each said bed area, said folding means including segments movable between a position spaced away from the contoured edges of the mandrel resting on each said bed area and a position adjacent those contoured edges and means for moving said segments between the aforesaid positions, whereby said protruding areas of the blanks are folded around said mandrel contoured edges to overlie the top surface of the mandrel and form the remaining hems; means for transferring one of said mandrels with folded blank and its associated folding means between their position at one separate bed area and a position overlying the other said mandrel and folding means on the other bed area so that the mandrels are in a registered relationship with the top surfaces and the remaining hems thereon facing; retaining means positioned exteriorly of said overlyingly positioned mandrels for attaching to the fabric of said blanks folded around said overlying mandrels; and means for moving said overlying mandrels relative to said retaining means in the direction of a non-contoured mandrel edge, thereby withdrawing said mandrels from within the overlying, folded blanks.

27. In an apparatus for fabricating a two-ply hemmed fabric article from two fabric blanks having border areas from which said hems are formed, the combination as described in claim 26 wherein said mandrels are connected by a hinge attached to corresponding non-contoured edges and said means for positioning said mandrels on separate bed areas includes means connecting to at least one said mandrel for rotating that mandrel about said hinge.

28. In an apparatus for fabricating a two-ply hemmed fabric article from two fabric blanks having border areas from which said hems are formed, the combination as described in claim 26 wherein one of said bed areas is on the surface a rotatable, closing platen having one edge attached by a hinge to a stationary platen on the surface of which the other of said bed areas is located, each said folding means is mounted on a different platen, and said means for transferring one mandrel and folding means atop the other includes means attached to said closing platen for rotating said closing platen about its hinge to overlie said stationary platen.

29. In an apparatus for fabricating a two-ply hemmed fabric article from two fabric blanks having border areas from which said hems are formed, the combination for folding hems in the blanks forming said plies comprising a bed having two separate, adjacent flat areas each having boundaries conforming to the outline of a blank; means for contacting each said bed area from above along a line inwardly of corresponding sides to crease a blank resting thereon and produce an upwardly extending flap; two flat mandrels each having the edges contoured except in one sector to the outline of said hemmed article; means for positioning each said mandrel on a different bed area atop a creased blank thereon to have the contoured edges of each mandrel lie on one side of said creasing line, whereby said flap is folded back beneath the overlying mandrel to form a first hem and the unfolded border areas of the blank protrude beyond said mandrel contoured edges; folding means mounted on said bed adjacent each said bed area, said folding means including segments movable between a position spaced away from the contoured edges of the mandrel resting on each said bed area and a position adjacent those contoured edges and means for moving said segments between the aforesaid positions, whereby said protruding border areas of the blanks are folded around said mandrel contoured edges to overlie the top surface of the mandrel and form the remaining hems; means for transferring one of said mandrels with folded blank and its associated folding means between their position at one separate bed area and a position overlying the other said mandrel and folding means on the other bed area such that the mandrels are in a registered relationship with the top surfaces and remaining hems thereon facing each other; retaining means positioned exteriorly of said overlyingly positioned mandrels for attaching to the fabric of said blanks folded around said overlying mandrels; and means for moving said overlying mandrels relative to said retaining means in the direction of the non-contoured mandrel sector, thereby withdrawing said mandrels from within the stacked and folded blanks which are assembled in final form within said retaining means.

30. In an apparatus for fabricating a multi-ply hemmed fabric article from fabric blanks having hems folded on the edges of at least the outer plies, the combination comprising a bed having a flat area on which a fabric blank having upwardly facing hems is positionable, means mounted above said bed and moving across said flat area for carrying a strip of adhesive material to lay said material over the top of a folded blank positioned on said bed area, means for positioning at least another fabric blank on said bed area over said adhesive strip positioned thereon and the blank thereunder, said blank positioning means arranging said blanks in a stack with their corresponding edges in registry and the topmost of said blanks having the hems facing downwardly, whereby said stack is arranged with a strip of adhesive between adjacent blanks, and means for transmitting to said stacked blanks energy which activates an adhesive between the stacked blanks, thereby causing the adhesive to adhere to adjacent blanks and bond them together into an integral, hemmed article.

31. In an apparatus for fabricating a multi-ply hemmed fabric article from fabric blanks having hems folded on the edges of at least the outer plies, the combination as described in claim 30, wherein said adhesive positioning means includes a horizontally movable head having an opening on the lower side connected to a vacuum source, means for moving said head between a position spaced above one side of said bed area and a position spaced above the opposite side of said area, and means for opening and closing the connection between said opening and said vacuum source, whereby the end of a strip of adhesive resting on the bed at said one side is drawn to and held by said opening upon opening said vacuum connection, is carried across said bed area and the blank resting thereon to the opposite side of the bed, and is released upon closing the vacuum connection, thereby positioning said adhesive strip over the folded blank.

32. The apparatus as described in claim 31 additionally including means for holding a roll of adhesive and located adjacent said bed on said one side to provide a supply of adhesive strip, and including cutting means associated with said bed for severing from said roll in a line at the edge of said one side of the bed area that portion of said strip positioned across the bed area.

33. In an apparatus for fabricating a multi-ply hemmed fabric article from fabric blanks having hems folded on the edges of at least the outer plies, the combination of a bed having a flat area on which a fabric blank having upwardly facing folded hems is positionable, means located above said bed and moving across said flat area bed for carrying a strip of adhesive material to lay said material on top of a folded fabric blank positioned on the bed area, means for positioning at least another fabric blank on said bed area over said adhesive strip positioned thereon and the blank thereunder, said blank positioning means arranging said blanks in a stack with their corresponding edges in registry and the topmost of said other blanks having the hems facing downwardly, whereby said stack is arranged with a strip of adhesive between adjacent blanks, a bonding medium adjacent to said bed and having means for supporting said stack, transfer means moving between said bed and said bonding medium for carrying said stacked blanks from said bed area to position said stack in said bonding medium, and means for supplying energy to said bonding medium, said bonding medium arranged to transmit to said stacked blanks said energy which activates said adhesive within the stacked blanks and causes the adhesive to adhere to the adjacent blanks and bond them together into an integral, hemmed article.

34. In an apparatus for fabricating a multi-ply hemmed fabric article from fabric blanks having hems folded on the edges of at least the outer plies, the combination as described in claim 33, wherein said bonding medium has two opposing bonding surfaces, and said energy comprises heat supplied to said surfaces and pressure applied between said surfaces, whereby said adhesive strip comprising a thermoplastic material bonds said blanks together under the influence of said heat and pressure.

35. In an apparatus for fabricating a two-ply hemmed fabric unit from fabric blanks with border areas from which said hems are formed, including two similar flat mandrels each of which has more than one but not all edges contoured to the outline of said fabric unit, and including means positioning said mandrels in an overlying registered relationship with a blank folded around each mandrel such that the blank extends across the outer facing mandrel surface and border areas are folded around all contoured mandrel edges to overlie the inner facing mandrel surface and with an adhesive material lying between the inner facing mandrel and folded blank surfaces, the combination comprising a bonding iron having two opposing surfaces with means for parting and closing said surfaces, means for positioning the overlying mandrels within said bonding surfaces and withdrawing them therefrom, wherein said withdrawal is in the direction of the non-contoured mandrel edges, fabric attaching means mounted on said bonding iron for attaching to the fabric of the blanks folded around said overlying mandrels positioned therewithin, whereby said folded blanks and adhesive are retained within closed surfaces of said bonding iron when said mandrels are withdrawn, and means for supplying energy to said bonding iron surfaces for transmittal to said folded blanks to activate said adhesive and bond the blanks into an integral, hemmed article.

36. In an apparatus for fabricating a two-ply hemmed fabric unit from fabric blanks with border areas from which said hems are formed, including two flat mandrels each of which has more than one but not all edges contoured to the outline of said fabric unit, and including means for positioning said mandrels in an overlying registered relationship with a blank folded around each mandrel such that the blank extends across the outer facing mandrel surface and border areas are folded around all contoured mandrel edges to overlie the inner facing mandrel surface and with an adhesive material lying between the inner facing mandrel and folded blank surfaces, the combination as described in claim 35, wherein said fabric attaching means comprises at least one needle mounted on said bonding iron to be axially movable through a hole piercing each said bonding surface adjacent the position of said contoured edges of the overlying mandrels when positioned within said surfaces, and means for inserting said needle into said hole to penetrate the fabric of said blanks covering the contoured mandrel edges and withdrawing said needle therefrom.

37. Apparatus for positioning succesive strips of adhesive material over folded fabric blanks resting on the upper surface of a bed, comprising means mounted adjacent one side of said bed holding a freely rotatable roll of adhesive material in which the outer end of the roll rests on said surface at said one side and is joined to the roll by a vertical loop, a horizontally movable head having an opening on the lower side mounted above said bed, means for connecting said opening to a vacuum source, means for opening and closing said connection to the vacuum source, means for moving said head from a position spaced above said one side of the surface to the opposite side, whereby the material from said loop is laid across a folded blank resting on said surface by opening said vacuum connection to draw said outer end of the roll against the head opening and moving the head to the opposite side of said surface where the end of said roll is dropped upon closing said vacuum connection, a movable cutter mounted above said one side of the surface, said cutter having a projecting edge cooperating with a mating projection on said surface to form a cutting edge which severs said material drawn from the loop over said surface and having a contacting surface on the side adjacent said roll which contacts said bed surface to pin the severed end of the material connected to said roll against said surface, means for positioning said cutter into and out of cooperating contact with said surface, a vertically movable loop forming element between said roll and said one side of the bed contacting said material extending from the roll to said bed, and means for moving said loop forming element vertically to draw additional material from the roll and form another loop while said cutter holds the severed end of the roll in contact with said surface.

38. A method of folding hems on a fabric unit, such as a cuff, comprising the steps of positioning a flat mandrel having at least one edge contoured to the shape of the article to overlie a fabric blank which has a border area along at least one edge folded back atop the blank to form a first hem and other border areas extending beyond said mandrel contoured edge, folding the other border areas of the blank around said mandrel contoured edge onto the top surface of the mandrel to form the remaining hems, positioning a surface atop said remaining hems overlying the top edges of the mandrel to hold said hems in place, and withdrawing said mandrel from within the folded blank in a direction away from said contoured mandrel edges 39. A method of fabricating a two-ply, hemmed fabric unit as a cuff, from two fabric blanks having border areas from which said hems are formed comprising the steps of folding a straight hem along at least one corresponding edge of each of the two said blanks, folding hems along the remaining unfolded edges of each blank of a width to contour the outline of the folded blanks to that of said hemmed unit, positioning a layer of thermoplastic material over that face of one of said folded blanks containing the folded hems, arranging said folded blanks together in an overlying relationship with the hems facing inwardly and with said layer of bonding material between said facing hems and blanks, trimming any portion of said thermoplastic material protruding beyond the edges of said overlying folded blanks and applying heat and pressure to said overlying blanks to activate said bonding material and cause it to adhere to said overlying blanks and bond them together into an integral unit.

References Cited by the Examiner
UNITED STATES PATENTS

| | | | |
|---|---|---|---|
| 2,201,908 | 5/1940 | McBurney et al. | 154—46 |
| 2,609,129 | 9/1952 | Goldberg | 223—38 |
| 2,639,841 | 5/1953 | Liebowitz | 223—2 |
| 2,853,214 | 9/1958 | Faw | 223—2 |
| 2,937,376 | 5/1960 | Golden | 2—143 |

JORDAN FRANKLIN, *Primary Examiner.*

THOMAS J. HICKEY, *Examiner.*

P. L. GARDNER, G. V. LARKIN, *Assistant Examiners.*